US012487965B2

(12) United States Patent
Wang

(10) Patent No.: US 12,487,965 B2
(45) Date of Patent: Dec. 2, 2025

(54) ALL REDUCE ACROSS MULTIPLE RECONFIGURABLE DATAFLOW PROCESSORS

(71) Applicant: SambaNova Systems, Inc., Palo Alto, CA (US)

(72) Inventor: Mingran Wang, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 213 days.

(21) Appl. No.: 18/208,048

(22) Filed: Jun. 9, 2023

(65) Prior Publication Data
US 2023/0409520 A1 Dec. 21, 2023

Related U.S. Application Data

(60) Provisional application No. 63/350,862, filed on Jun. 9, 2022.

(51) Int. Cl.
G06F 9/44 (2018.01)
G06F 8/41 (2018.01)
(Continued)

(52) U.S. Cl.
CPC ............ *G06F 15/825* (2013.01); *G06F 8/433* (2013.01); *G06F 8/4441* (2013.01); *G06F 15/17375* (2013.01); *G06F 17/16* (2013.01)

(58) Field of Classification Search
CPC ...... G06F 8/433; G06F 8/4441; G06F 15/825; G06F 15/17375; G06F 17/16
See application file for complete search history.

(56) References Cited

U.S. PATENT DOCUMENTS 1,120,488 A   12/1914   Hewitt
1,123,797 A    1/1915   Bruno
(Continued)

FOREIGN PATENT DOCUMENTS

WO   2010142987 A1   12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Qamrun Nahar
(74) *Attorney, Agent, or Firm* — Flagship Patents; Sikander M. Khan; Stephanie Backovic

(57) ABSTRACT

A method for a reconfigurable computing system includes receiving a compute graph for execution on multiple RDPs interconnected with a ring network having R interconnected RDPs. A compute graph with a node specifying a reduction operation for a first and second tensor is detected. The detected compute graph node is partitioned into a compute subgraph corresponding to an RDP of the R interconnected RDPs. A first node is inserted into the compute subgraph that specifies a partial reduction operation for producing a partial reduction result corresponding to a shard of the first tensor and a shard of the second tensor. A second node is inserted for communicating the partial reduction result to an adjacent RDP. A third node is inserted that specifies a reduction operation for producing a total reduction result. A fourth node is inserted for communicating the total reduction result to at least one other RDP.

19 Claims, 17 Drawing Sheets

(51) Int. Cl.
    *G06F 15/173*     (2006.01)
    *G06F 15/82*     (2006.01)
    *G06F 17/16*     (2006.01)

(56) References Cited

U.S. PATENT DOCUMENTS

| | | | |
|---|---|---|---|
| 10,768,899 | B2 | 9/2020 | Koeplinger et al. |
| 11,003,429 | B1 * | 5/2021 | Zejda .................. G06F 8/445 |
| 11,429,349 | B1 | 8/2022 | Oklobdzija et al. |
| 11,748,622 | B1 * | 9/2023 | Borkovic .................. G06F 8/44 706/15 |
| 2020/0142743 | A1 * | 5/2020 | Zhang .................. G06F 9/5061 |
| 2020/0410354 | A1 * | 12/2020 | Zejda .................. G06F 9/3861 |
| 2021/0192314 | A1 * | 6/2021 | Aarts .................. G06F 8/456 |
| 2021/0357475 | A1 | 11/2021 | Wang et al. |
| 2021/0373867 | A1 | 12/2021 | Chen et al. |
| 2022/0092247 | A1 | 3/2022 | Koeplinger et al. |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

Zhang et al., "SARA: Scaling a Reconfigurable Dataflow Accelerator," 2021 ACM/IEEE 48th Annual International Symposium on Computer Architecture (ISCA), 2021, pp. 1041-1054.

\* cited by examiner

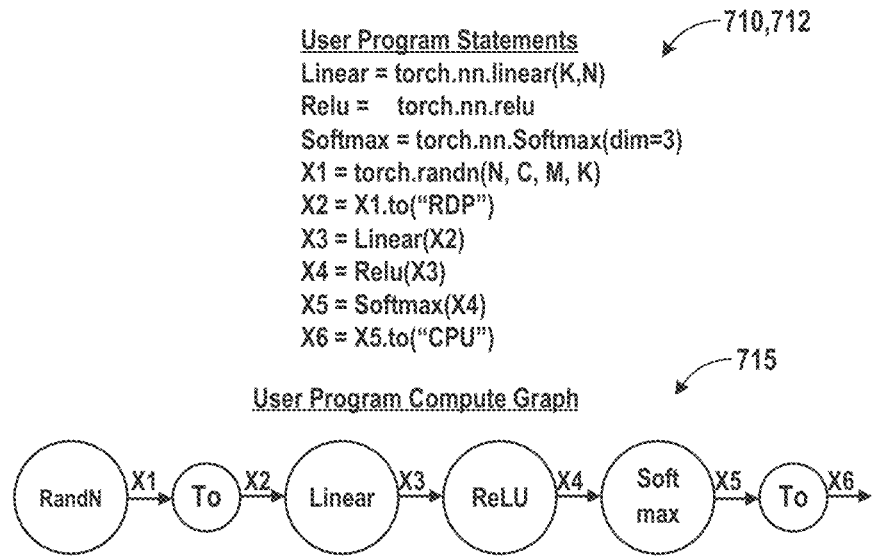
FIG. 7A
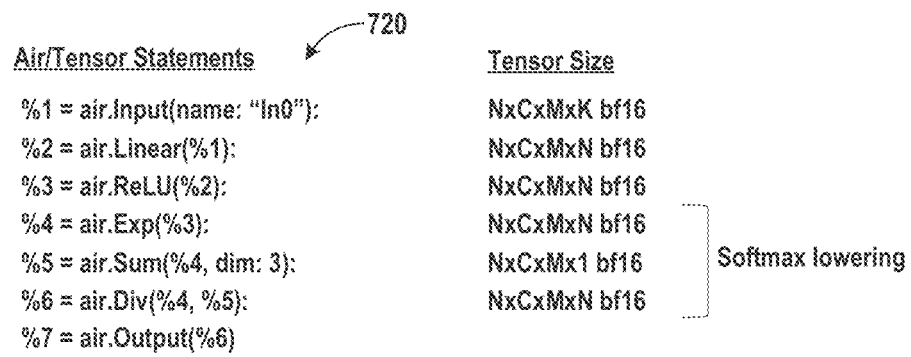
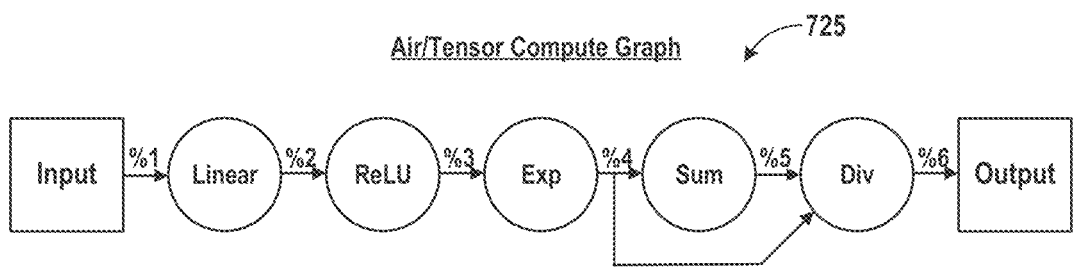
FIG. 7B

730 →

| Template Dataflow Statements | Tensor Size |
|---|---|
| %1 = tlir.Region(name: "In0"): | NxCxMxK bf16 |
| %2 = tlir.Region(name: "Weight"): | KxN bf16 |
| %3 = tlir.Region(name: "Bias"): | 1xN bf16 |
| %4 = tlir.Region(name: "Out0"): | NxCxMxN bf16 |
| %5 = tlir.Load(%2) | |
| %6 = tlir.Load(%3)　732 | |
| %7 = tlir.MetaPipeline(iters: N) { | |
| 　%8 = tlir.Load(%1, dim: 1): | CxMxK bf16 |
| 　%9 = tlir.Buffer(%5, depth: 2); 732 | CxMxK bf16 |
| 　%10 = tlir.MetaPipeline(iters: C) { | |
| 　　%11 = tlir.ReadSlice(%9, dim: 1): | MxK bf16 |
| 　　%12 = tlir.Linear(%5, %11): | MxN bf16 |
| 　　%13 = tlir.Buffer(%12, depth: 2): | MxN bf16 |
| 　　%14 = tlir.AddBias(%13, %6): | MxN bf16 |
| 　　%15 = air.ReLU(%14): | MxN bf16 |
| 　　%16 = air.Exp(%15): | MxN bf16 |
| 　　%17 = tlir.Buffer(%16, depth: 2): | MxN bf16 |
| 　　%18 = tlir.Sum(%17, dim: 1): | Mx1 bf16 |
| 　　%19 = tlir.Div(%17, %18): | MxN bf16 |
| 　　%20 = tlir.Store(%4, %19) | |
| 　} | |
| } | |

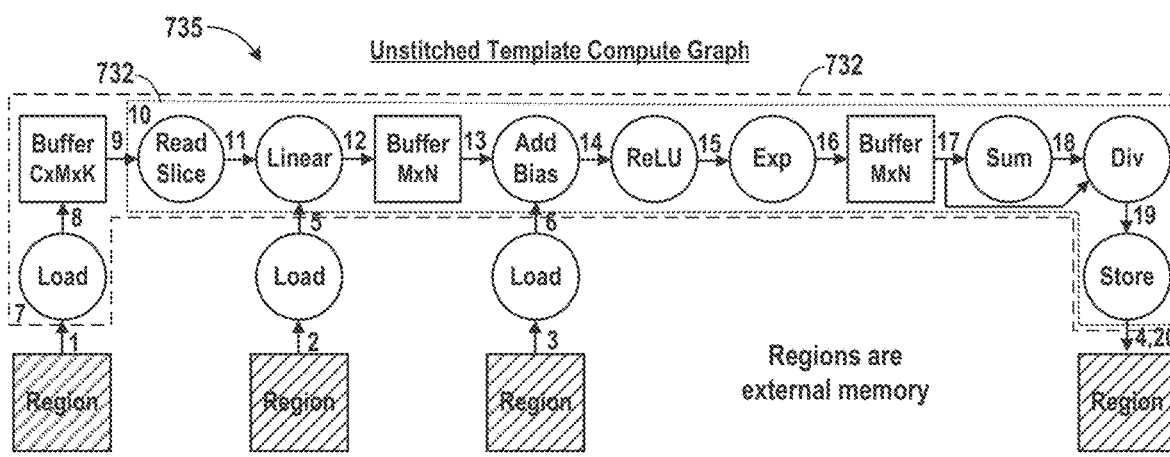

FIG. 7C

Example 1

1105 — Query, Key, Value (Q, K, V) GEMM : [ 36k, 12k ] * [ 12k, 2048 ]
=> $RDP_0$ ... $RDP_7$, each [4.5k, 12k] * [12k, 2048]

---

Example 2

1110 — MHA(Q, K, V) = $[head_1, ..., head_h]W_o$,
1113 → where $head_i$ = Attention($QW_i^Q, KW_i^K, VW_i^V$),
W are all learnable parameter matrices  — 1112 (1111)

1120:
Q → Linear / h layers →
K → Linear / h layers →   →  Scaled Dot Product Attention *h* layers  → Concat → Linear
V → Linear / h layers →
        1125                        1130                   1160        1125

1140 — Attention(Q, K, V) = softmax($QK^T / \sqrt{d_k}$)V

1150 — Matmul (Softmax (Scale (Matmul(Q,K))), V)
```
def Scaled_dot_product_attention(q, k, v):
    matmul_qk = tf.matmul(q, k, transpose_b=true)
    dk = tf.cast(tf.shape(k)[-1], tf.float32)
    scaled_attention_logits = matmul_qk / tf.math.sqrt(dk)
    attention_weights = tf.nn.softmax(scaled_attention_logits, axis= -1)
    output= tf.matmul(attention_weights, v)
    return output, attention_weights
```
1170 — MHA GeMM: [12k, 12k] * [12k, 2048] => $RDP_0$ ... $RDP_7$, each [12k, 1.5k] * [1.5k, 2048]
1171 — $RDP_0 \leftrightarrow RDP_1 \leftrightarrow RDP_2 \leftrightarrow RDP_3 \leftrightarrow RDP_4 \leftrightarrow RDP_5 \leftrightarrow RDP_6 \leftrightarrow RDP_7$

---

Example 3

1180 — FFN(x) = max(0, $xW_1 + b_1$) $W_2 + b_2$

1190 — FFN0 GeMM: [48k, 12k] * [12k, 2048] => $RDP_0$ ... $RDP_7$, each [6k, 12k] * [12k, 2048]

1195 — FFN1 GeMM: [12k, 48k] * [48k, 2048] => $RDP_0$ ... $RDP_7$, each [12k, 6k] * [6k, 2048]
1196 — $RDP_0 \leftrightarrow RDP_1 \leftrightarrow RDP_2 \leftrightarrow RDP_3 \leftrightarrow RDP_4 \leftrightarrow RDP_5 \leftrightarrow RDP_6 \leftrightarrow RDP_7$

FIG. 11

| Reduction or Broadcast | Pipeline Type | RDP_0 | RDP_1 | RDP_2 |
|---|---|---|---|---|
| R | Meta-pipe | GeMM | | |
| R | Inter-chip | PShim / PCIe / PShim | | |
| R | Meta-pipe | | GeMM | |
| R | Meta-pipe | | Addn | |
| R | Inter-chip | | PShim / PCIe / PShim | |
| R | Meta-pipe | | | GeMM |
| R | Meta-pipe | | | Addn |
| Br | Inter-chip | | PShim / PCIe / PShim | |
| Br | Inter-chip | PShim / PCIe / PShim | | |

FIG. 14

ALL REDUCE ACROSS MULTIPLE RECONFIGURABLE DATAFLOW PROCESSORS

RELATED APPLICATIONS AND DOCUMENTS

This application claims the benefit of (priority to) U.S. Provisional Application 63/350,862 filed on Jun. 9, 2022, entitled "GPT-175B All Ring Reduce".

This application is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- Zhang et al., "SARA: Scaling a Reconfigurable Dataflow Accelerator," 2021 ACM/IEEE 48th Annual International Symposium on Computer Architecture (ISCA), 2021, pp. 1041-1054;
- U.S. Nonprovisional patent application Ser. No. 16/260,548, filed Jan. 29, 2019, entitled "MATRIX NORMAL/TRANSPOSE READ AND A RECONFIGURABLE DATA PROCESSOR INCLUDING SAME,";
- U.S. Nonprovisional patent application Ser. No. 15/930,381, filed May 12, 2020, entitled "COMPUTATIONALLY EFFICIENT GENERAL MATRIX-MATRIX MULTIPLICATION (GEMM),";
- U.S. Nonprovisional patent application Ser. No. 16/890,841, filed Jun. 2, 2020, entitled "ANTI-CONGESTION FLOW CONTROL FOR RECONFIGURABLE PROCESSORS,";
- U.S. Nonprovisional patent application Ser. No. 17/023,015, filed Sep. 16, 2020, entitled "COMPILE TIME LOGIC FOR DETECTING STREAMING COMPATIBLE AND BROADCAST COMPATIBLE DATA ACCESS PATTERNS,";
- U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION,";
- U.S. Nonprovisional patent application Ser. No. 17/216,647, filed Mar. 29, 2021, entitled "TENSOR PARTITIONING AND PARTITION ACCESS ORDER,";
- U.S. Provisional Patent Application No. 63/190,749, filed May 19, 2021, entitled "FLOATING POINT MULTIPLY-ADD, ACCUMULATE UNIT WITH CARRY-SAVE ACCUMULATOR,";
- U.S. Provisional Patent Application No. 63/174,460, filed Apr. 13, 2021, entitled "EXCEPTION PROCESSING IN CARRY-SAVE ACCUMULATION UNIT FOR MACHINE LEARNING,";
- U.S. Nonprovisional patent application Ser. No. 17/397,241, filed Aug. 9, 2021, entitled "FLOATING POINT MULTIPLY-ADD, ACCUMULATE UNIT WITH CARRY-SAVE ACCUMULATOR,";
- U.S. Nonprovisional patent application Ser. No. 17/520,290, filed Nov. 5, 2021, entitled "SPARSE MATRIX MULTIPLIER IN HARDWARE AND A RECONFIGURABLE DATA PROCESSOR INCLUDING SAME,";

All of the related application(s) and documents listed above are hereby incorporated by reference herein for all purposes.

BACKGROUND

The present subject matter relates to optimizing computing tasks for course-grained reconfigurable (CGR) processors.

Reconfigurable processors can be configured to implement a variety of functions more efficiently or faster than might be achieved using a general-purpose processor executing a computer program. For example, coarse-grain reconfigurable architectures (e.g. CGRAs) are being developed in which the configurable units in the array are more complex than used in typical, more fine-grained FPGAs, and may enable faster or more efficient (e.g., dataflow) execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Despite the promise of CGRAs, optimizing the compute graphs for the configurable units of a CRGA remains a challenge.

SUMMARY OF THE INVENTION

A method that includes receiving a compute graph for execution on multiple reconfigurable dataflow processors (RDPs), such that the multiple RDPs are interconnected with a ring network. The ring network has R interconnected RDPs. The detected compute graph includes a node specifying a reduction operation for a first and second tensor. The first tensor has a batch dimension of 1 and the second tensor is sliced in the batch dimension (B) to form the first tensor slice and a second tensor slice (of the B tensor slices). The first tensor slice and a second tensor slice (of the B tensor slices) are sharded to produce R (distinct) shards of the first tensor slice and R (distinct) shards of the second tensor slice. Each slice of the B second tensor slices may be sharded in the same manner and may be paired with the same first tensor slice as input to the sharding process.

The compute graph node is partitioned into a compute subgraph that corresponds to an RDP of the R interconnected RDPs. A first node is inserted into the compute subgraph. The first node specifies a partial reduction operation for producing a partial reduction result. The first node receives a shard of the first tensor and a shard of the second tensor as input. A second node is inserted into the compute subgraph for communicating the partial reduction result to an adjacent RDP on the ring network. A third node is inserted into the compute subgraph that specifies a reduction operation for producing a total reduction result for the first and second tensor. A fourth node is inserted into the compute subgraph for communicating the total reduction result to at least one other RDP on the ring network.

In some embodiments, the first node specifying the partial reduction result corresponds to a GeMM operation. The GeMM operation has a GeMM meta-pipeline latency. In other embodiments, the shard of the second tensor is further tiled and provided to a compute unit within an RDP. Communicating a partial reduction result to an adjacent RDP on the ring network results in an inter-chip latency. Runtime performance may be optimized if inter-chip latency is less than the GeMM meta-pipeline latency. Runtime Performance may be further enhanced by distributing sharded tensor data (that can be further optionally tiled) to each of the R interconnected RDPs. The method is useful for processing large NN models.

BRIEF DESCRIPTION OF THE DRAWINGS

FIGS. 7A-7E illustrate various representations of an example user program corresponding to various stages of a compiler stack such as the compiler stack of FIG. 6.

FIG. 11 shows three examples of sharding input tensor data across multiple RDPs for processing.

FIG. 14 shows one example of dataflow through the pipeline in executing the compute graph of the methods described herein.

DETAILED DESCRIPTION

Figure 1:
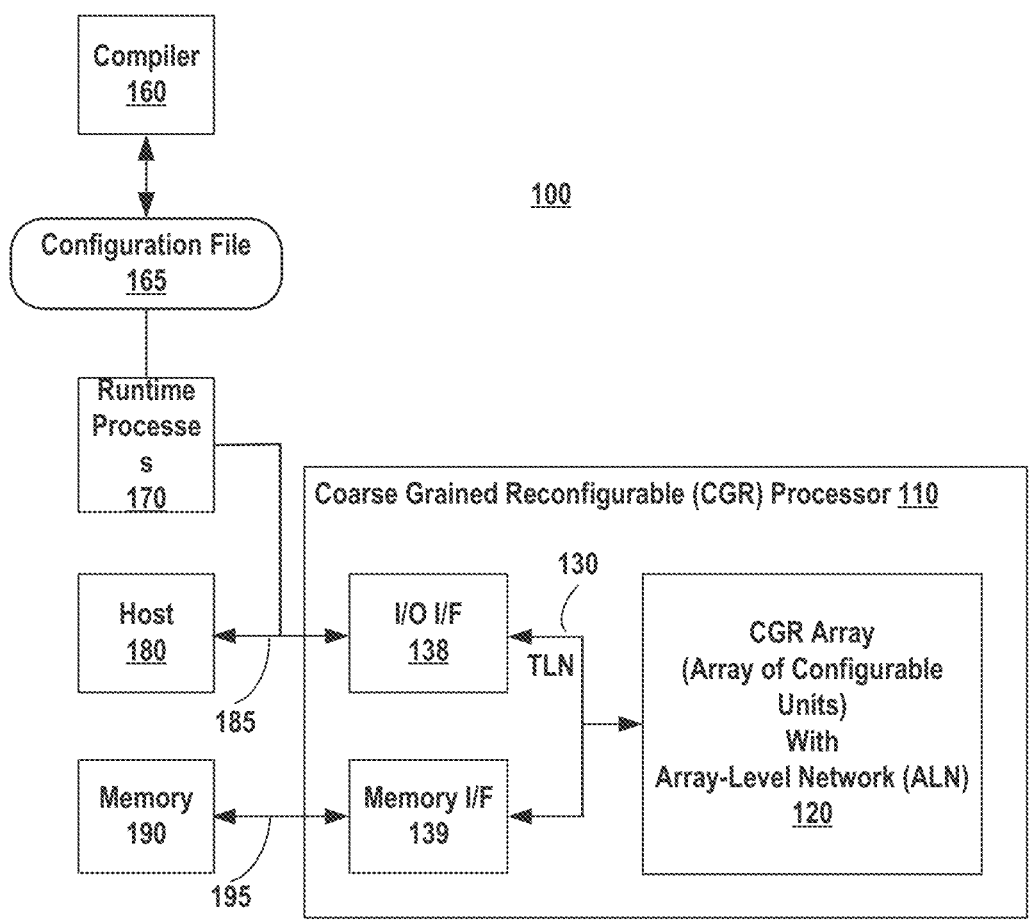
FIG. 1 illustrates an example system including a coarse-grained reconfigurable (CGR) processor, a host, and a memory.

The following detailed description is made with reference to the figures. Example implementations are described to illustrate the technology disclosed, not to limit its scope, which is defined by the claims. Those of ordinary skill in the art will recognize a variety of equivalent variations on the description that follows.

FIGS. 1-7E depict at least one example of an environment wherein the disclosed technology may be deployed while FIGS. 8-16 depict details on various examples of the disclosed technology.

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable (CGR) architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).
AI—artificial intelligence.
AIR—arithmetic or algebraic intermediate representation.
ALN—array-level network.
Buffer—an intermediate storage of data.
CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.
CGRA—coarse-grained reconfigurable architecture. A data processor architecture that includes one or more arrays (CGR arrays) of CGR units.
Compiler—a translator that processes statements written in a programming language to machine language instructions for a computer processor. A compiler may include multiple stages to operate in multiple steps. Individual stages may create or update an intermediate representation (IR) of the translated statements. Compiler stages are illustrated with reference to FIG. 6.
Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Logical CGR array or logical CGR unit—a CGR array or a CGR unit that is physically realizable, but that may not have been assigned to a physical CGR array or to a physical CGR unit on an IC.

Meta-pipeline—see pipeline.

ML—machine learning.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level (typically a sequence of logical operations that are to be repetitively executed) that enables correct timing and loop control of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can store data according to a programmed pattern.

PNR—place and route—the assignment of logical CGR units and associated processing/operations to physical CGR units in an array, and the configuration of communication paths between the physical CGR units.

RAIL—reconfigurable dataflow processor (RDP) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLIR—template library intermediate representation.

TLN—top-level network.

Implementations

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. See, for example, FIGS. 6 and 7A-7E. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example coarse-grained reconfigurable architecture (CGRA) system 100 including a coarse-grained reconfigurable (CGR) processor 110 a compiler 160, runtime processes 170, a host 180, and a memory 190. CGR processor 110 includes a CGR array such as a CGR array 120. CGR array 120 includes an array of configurable units in an array level network. CGR processor 110 further includes an IO interface 138, and a memory interface 139. CGR array 120 is coupled with IO interface 138 and memory interface 139 through a data bus 130 which may be part of a top-level network (TLN). Host 180 communicates with IO interface 138 using a system data bus 185, and memory interface 139 communicates with memory 190 using a memory bus 195. A configurable unit in the CGR array 120 may comprise a compute unit or a memory unit. A configurable unit in the CGR array 120 may also comprise a pattern memory unit (PMU), a pattern compute unit (PCU), or a fused-compute memory unit (FCMU). Further examples include a coalescing unit (CU) and an address generator (AG), which may be combined in an AGCU. A configurable unit may also be reconfigurable.

The configurable units in the CGR array 120 may be connected with an array-level network (ALN) to provide the circuitry for execution of a computation graph or a dataflow graph that may have been derived from a high-level program with user algorithms and functions. The high-level program may include a set of procedures, such as learning or inferencing in an artificial intelligence (AI) or machine learning (ML) system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple CGR processors 110. In some implementations, CGR processor 110 may include one or more ICs. In other implementations, a single IC may span multiple CGR processors 110. In further implementations, CGR processor 110 may include multiple arrays of configurable units 120.

Host 180 may be, or include, a computer such as further described with reference to FIG. 2. Host 180 runs runtime processes 170, as further referenced herein, and may also be used to run computer programs, such as compiler 160 further described herein with reference to FIG. 9. In some implementations, compiler 160 may run on a computer that is similar to the computer described with reference to FIG. 2 but separate from host 180.

CGR processor 110 may accomplish computational tasks by executing a configuration file 165. Configuration file 165 may comprise a processor-executable format file suitable for configuring a CGR array 120 of a CGR processor 110. For the purposes of this description, a configuration file corresponds to a dataflow graph, or a translation of a dataflow graph, and may further include initialization data. Compiler 160 compiles the high-level program to provide the configuration file 165. In some implementations described herein, a CGR array 120 is configured by programming one or more configuration stores with all or parts of the configuration file 165. A single configuration store may be at the level of the CGR processor 110 or the CGR array 120, or a configurable unit may include an individual configuration store. The configuration file 165 may include configuration data for the CGR array 120 and the configurable units in the CGR array 120, and link the computation graph to the CGR array 120. Execution of the configuration file 165 by CGR processor 110 causes the array(s) of configurable units 120(s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
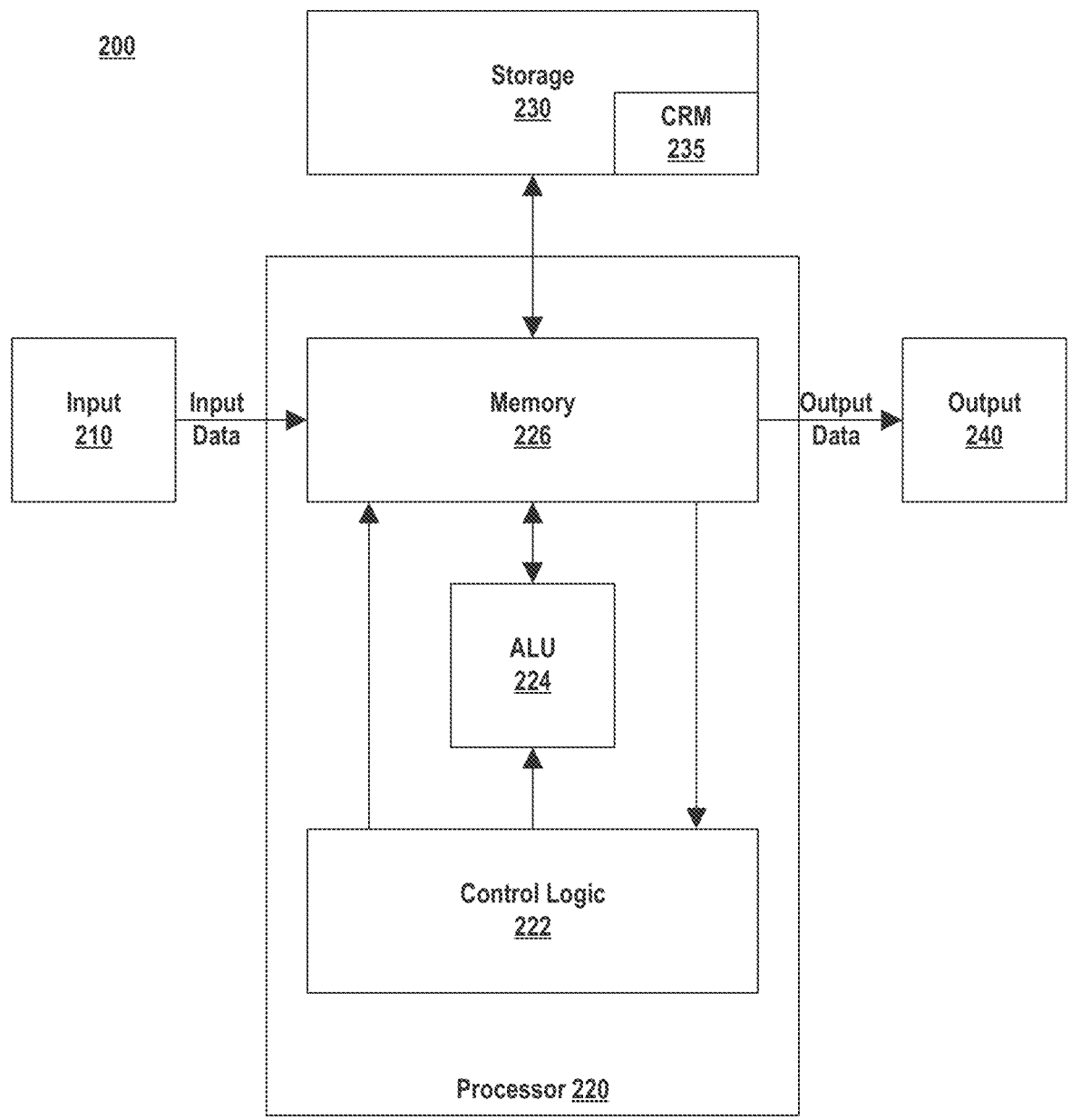
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
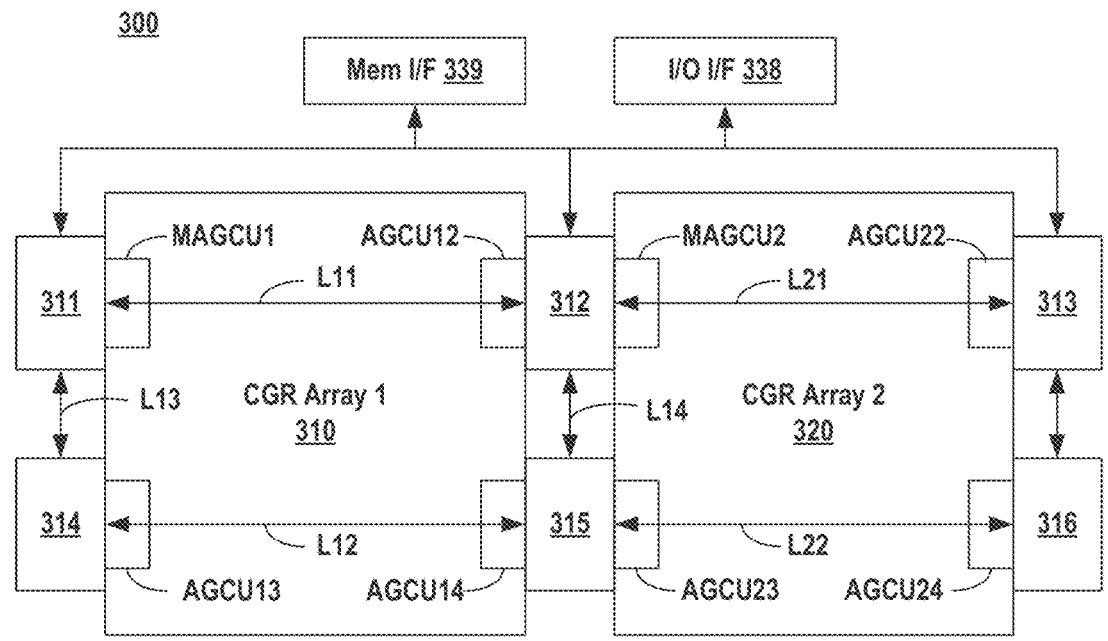
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
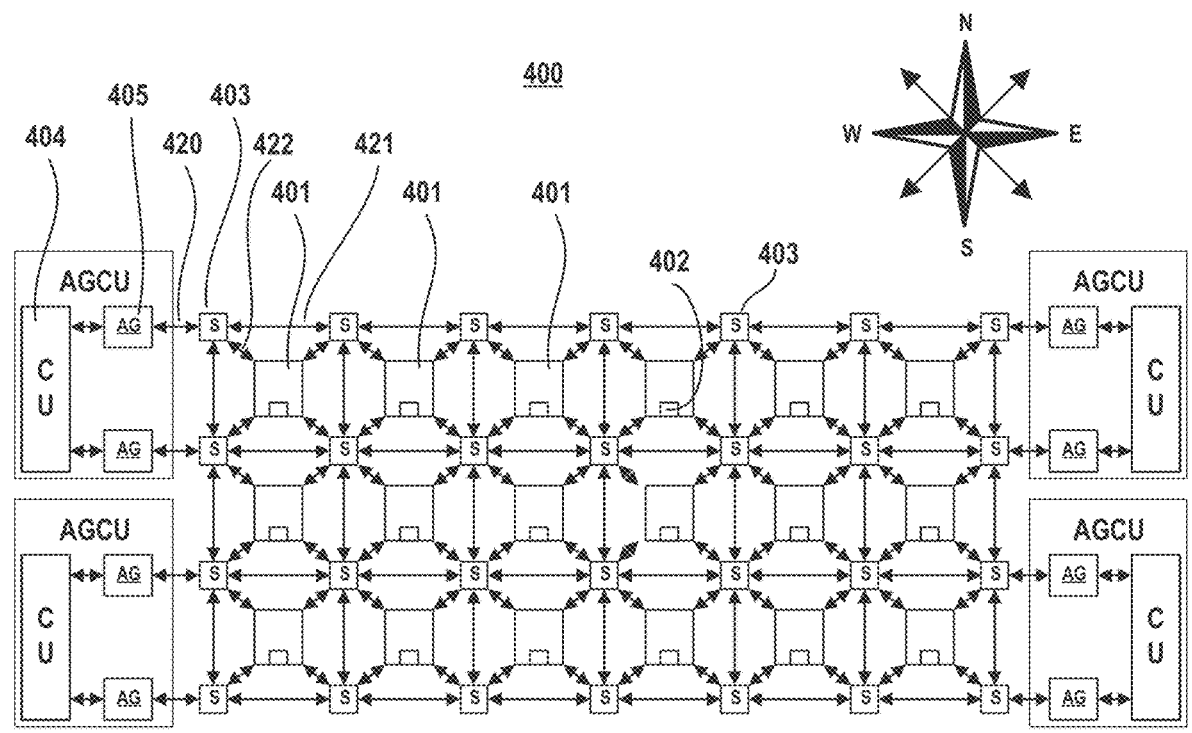
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed by individual stages, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of individual CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of individual packets and other information such as sequence numbers that can be used to reassemble a file when the packets are received out of order. Individual packet headers can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Individual ports may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Individual interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
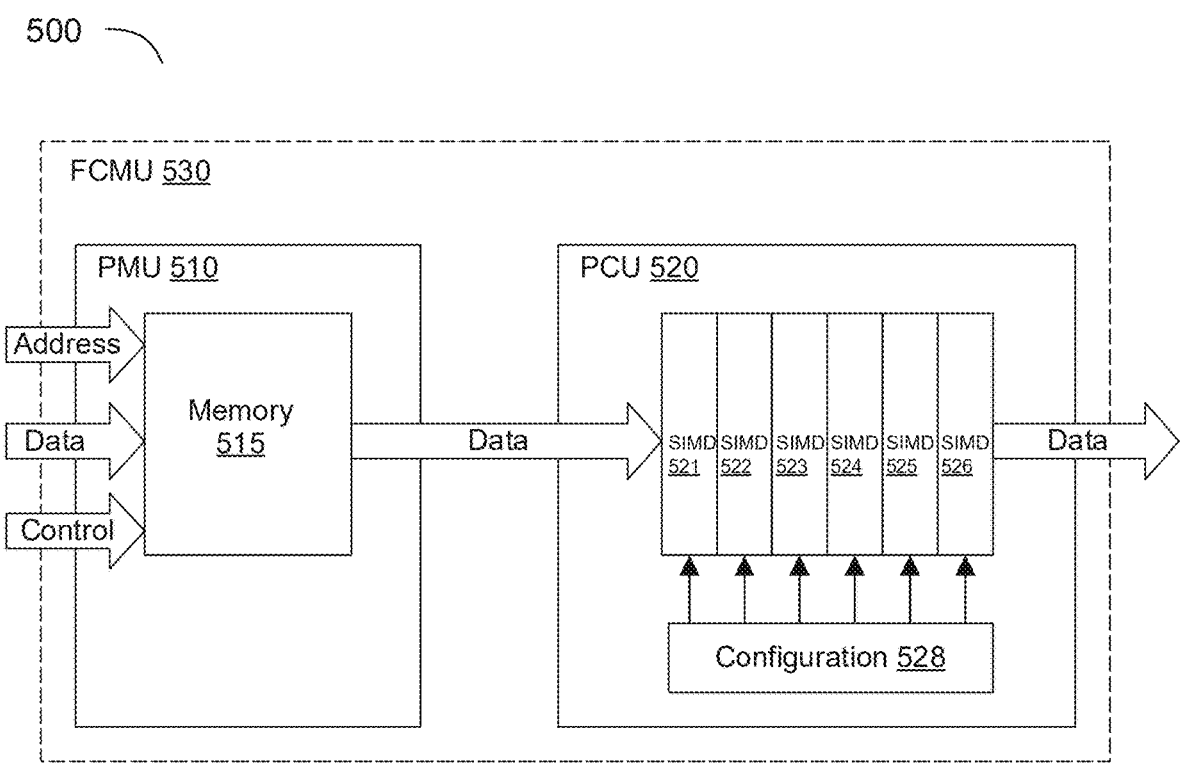
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Individual stages in PCU 520 may also hold one or more registers (not drawn) for short-term storage of parameters. Short-term storage, for example during one to several clock cycles or unit delays, allows for synchronization of data in the PCU pipeline.

Figure 6:
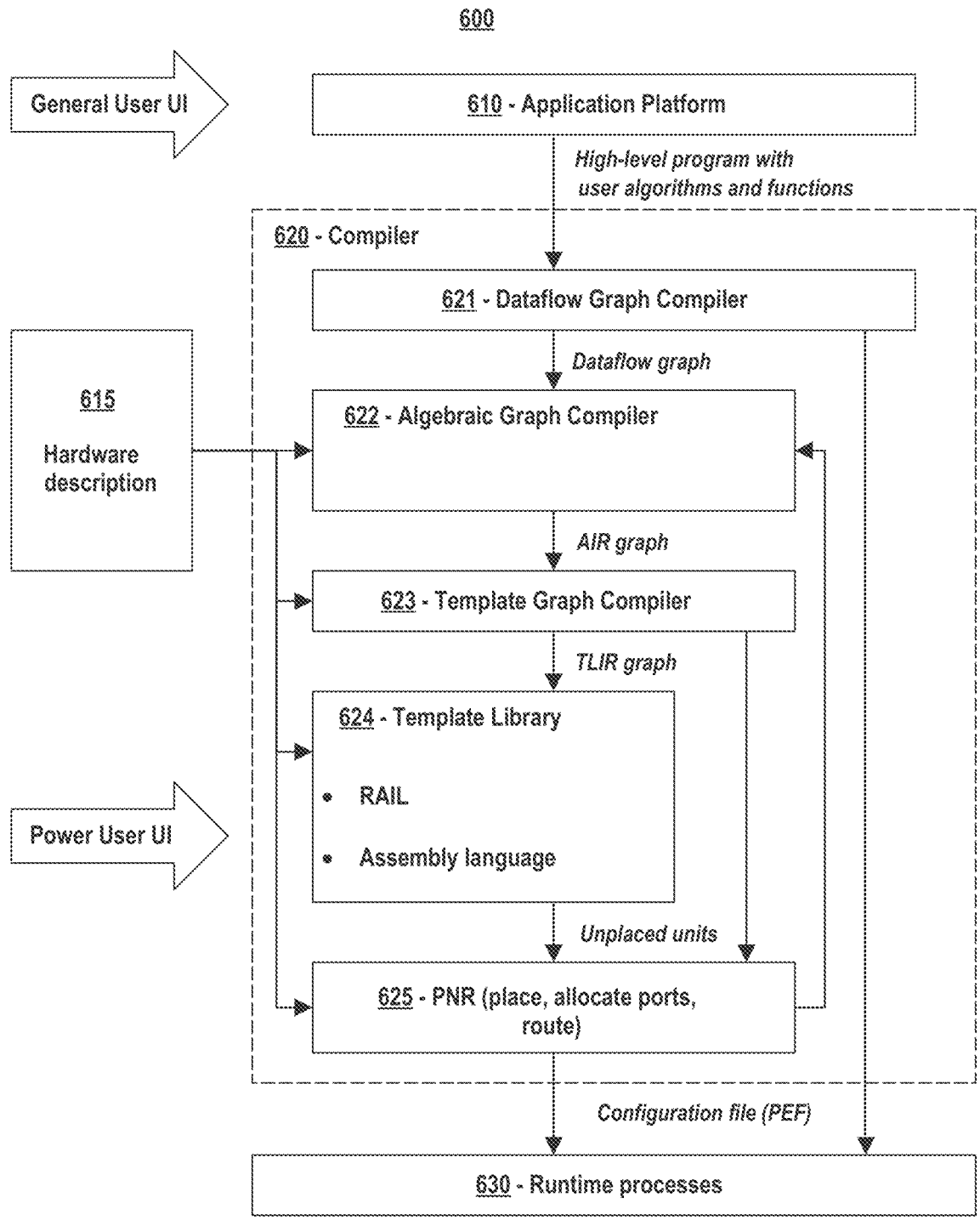
FIG. 6 is a block diagram of a compiler stack implementation suitable for generating a configuration file for a CGR processor.

Referring now to FIG. 6 which is a block diagram of a compiler stack 600 implementation suitable for generating a configuration file for a CGR processor. Referring also to FIGS. 7A-7E which illustrate various representations of an example user program 710 corresponding to various stages of a compiler stack such as the compiler stack 600. As depicted, compiler stack 600 includes several stages to convert a high-level program (e.g., user program 710) with statements 712 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 710 depicted in FIG. 7A comprises statements 712 that invoke various PyTorch functions.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router (PNR) 625. In some implementations, template library 624 includes RDP abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 622 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 622 may further include an arithmetic or algebraic intermediate representation (AIR) stage that translates high-level graph and mapping decisions provided by the MAC level into explicit AIR/Tensor statements 720 and one or more corresponding algebraic graphs 725 as shown in FIG. 7B. In the depicted example, the algebraic graph compiler replaces the Softmax function specified in the user program 710 by its constituent statements/nodes (i.e., exp, sum and div). Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 623 may translate AIR statements and/or graphs into TLIR statements 730 and/or graph(s) 735 (see FIG. 7C), optimizing for the target hardware architecture, into unplaced variable-sized units (referred to as logical CGR units) suitable for PNR 625. Meta-pipelines 732 that enable iteration control may be allocated for sections of the TLIR statements and/or corresponding sections of the graph(s) 735. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 7D:
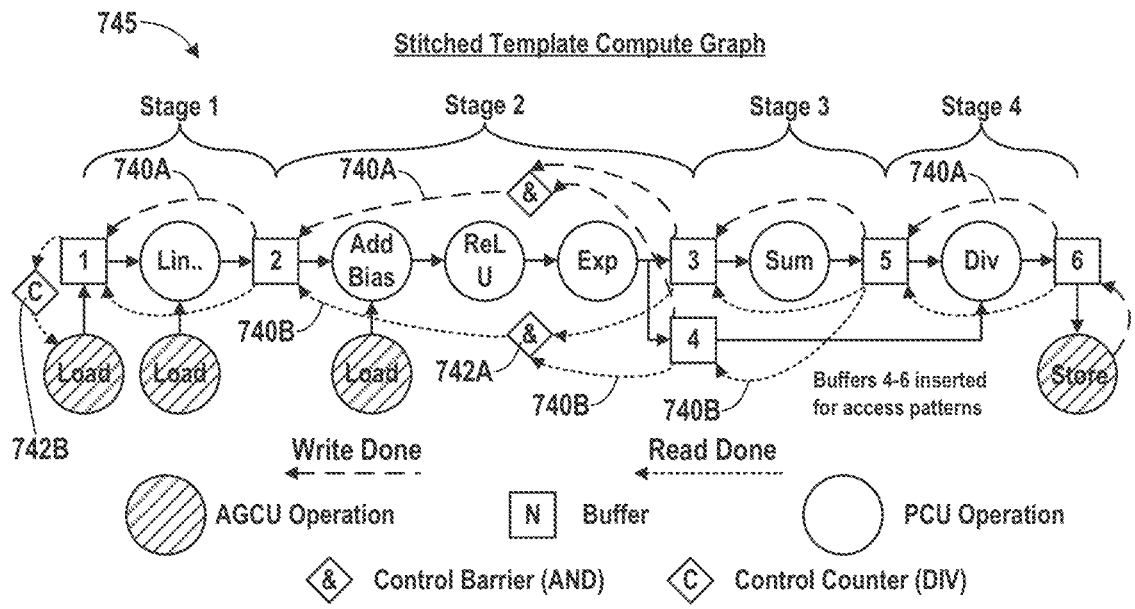
Figure 7E:
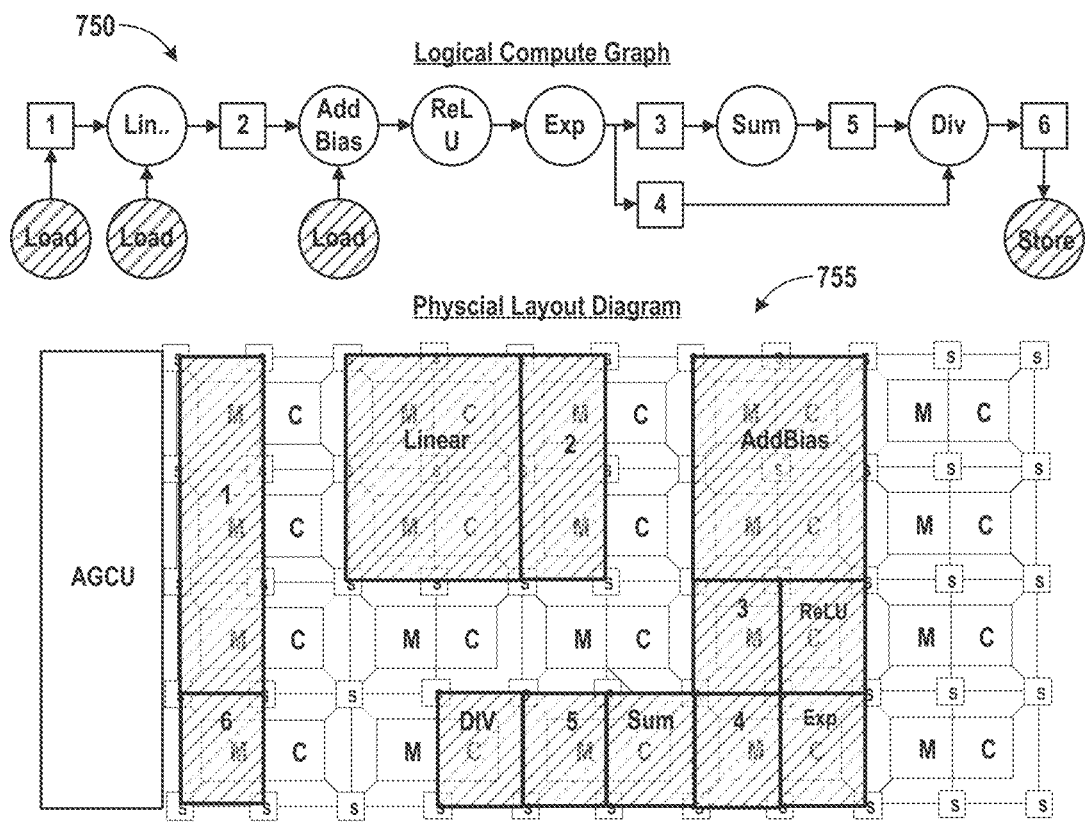

Referring to FIG. 7D, the template graph compiler may also determine the control signals 740 and control gates 742 required to enable the CGR units (whether logical or physical) to coordinate dataflow between the CGR units on the communication fabric of a CGR processor. This process, sometimes referred to as stitching, produces a stitched template compute graph 745 with control signals 740 and control gates 742. In the example depicted in FIG. 7D, the control signals 740 include write done signals 740A and read done signals 740B and the control gates 742 include 'AND' gates 742A and a counting or 'DIV' gate 742B. The control signals 740 and control gates 742 enable coordinated dataflow between the configurable units of CGR processors such as compute units, memory units, and AGCUs.

PNR 625 translates and maps logical (i.e., unplaced physically realizable) CGR units (e.g., the nodes of the logical compute graph 750 shown in FIG. 7E) to a physical layout (e.g., the physical layout 755 shown in FIG. 7E) on the physical chip level e.g., a physical array of CGR units. PNR 625 also determines physical data channels to enable communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 8:
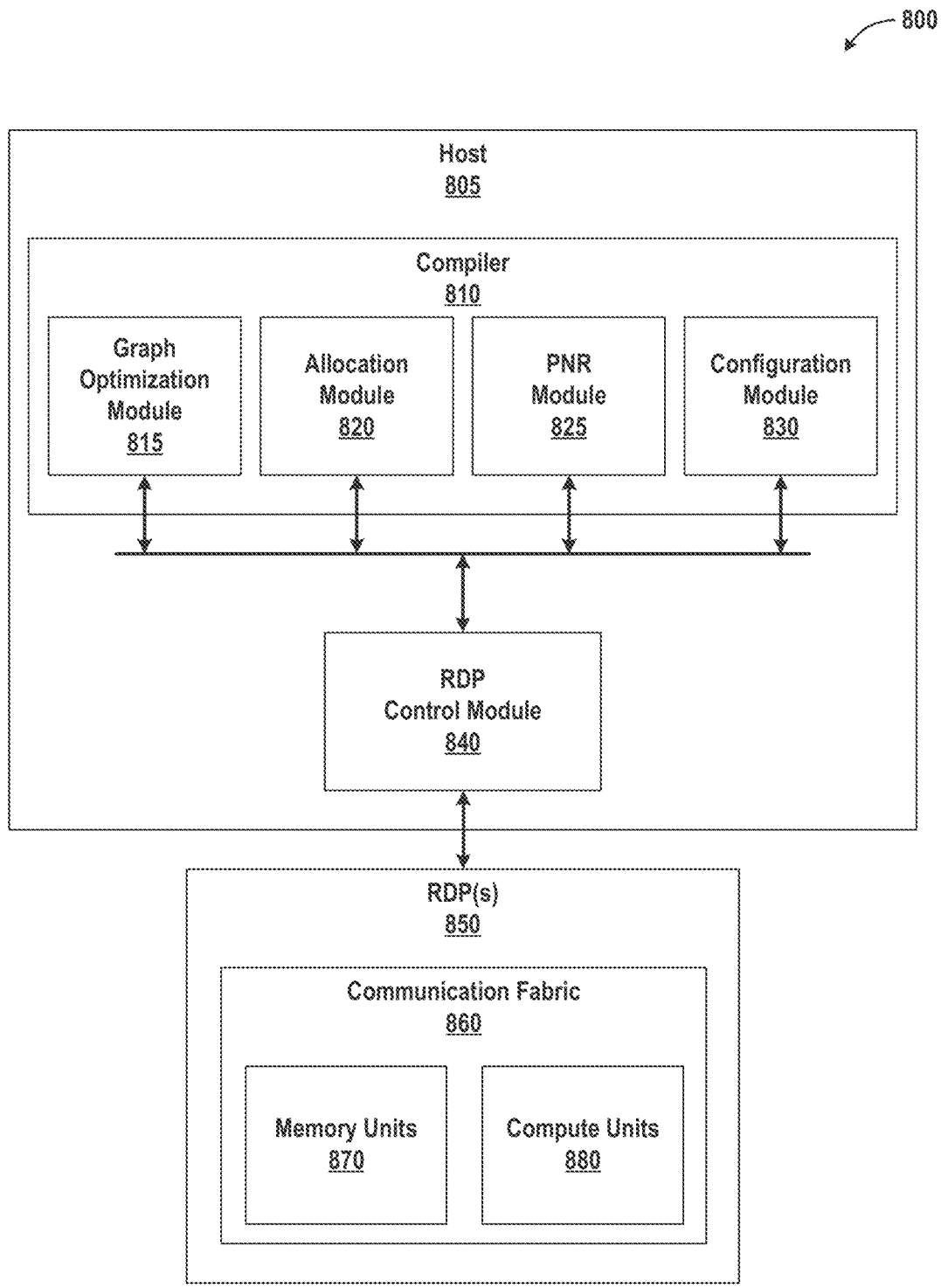
FIG. 8 is a block diagram illustrating one example of a CGR dataflow computing system.

FIG. 8 is a block diagram illustrating one example of a CGR dataflow computing system 800. As depicted, the CGR dataflow computing system 800 includes a graph optimization module 815, an allocation module 820, a place and route module 825, a configuration module 830, a reconfigurable dataflow processor (RDP) control module 840, and one or more RDPs 850 comprising a communication fabric 860, memory units 870 and compute units 880. The CGR dataflow computing system 800 enables evaluation and selection of template configurations as well as placement, routing, configuration, and deployment of those configured templates on the configurable units of the reconfigurable dataflow processors (RDPs) 850.

The depicted modules 815-840 may reside within, or be available to (e.g., within a library), a compiler 810 that executes on a host 805 and compiles computing tasks for execution on the RDPs 850. The computing task may be represented with a compute graph and/or code statements that indicate the mathematical operations that are to be executed. The graph optimization module 815 may analyze the subgraphs and nodes of a compute graph for a computing task and make changes to subgraphs and/or nodes to improve performance, optimize resource utilization, and/or alleviate place and route issues while maintaining the intended results of the computing task.

The allocation module 820 may allocate virtual compute units and memory units to the computing task or a portion thereof and may determine the number of compute units and the number of memory units required to support an operation. The allocation module 820 may function in conjunction with a partitioner (not shown) that partitions the compute graph into executable sub-graphs and inserts virtual memory units (i.e., buffers) into the compute graph that enable dataflow execution of the sub-graphs on reconfigurable dataflow processors such as the RDPs 850.

The place and route module 825 may generate multiple placement graph options corresponding to the computing task and select the placement graph that best meets the objectives and resources of the RDPs 850. For example, in some situations throughput may be the primary objective while in other situations, minimizing consumed resources may be the primary objective. The placement graphs may specify physical compute units, memory units and switch units that correspond to the virtual units of the executable sub-graph. To reduce communication distance and latency, the specified physical compute units, memory units, and switch units may be neighbors in a computing grid on an RDP 850.

The configuration module 830 may generate configuration information for the configuration units specified in the selected placement graphs. The RDP control module 840 may communicate the configuration information to the RDPs 850 and initiate dataflow in the computing grid. The communication fabric 860 may comprise switch units (not shown) that enable communication between the RDP control module 840 and memory units 870 and compute units 880 within the RDP(s) 850. One of skill in the art will appreciate that the placement graphs specified for execution may be relocated at runtime to a currently available RDP and/or a currently available region with a computing grid (e.g., tile region) of an RDP. The relocation may preserve the relative positions and connectivity of the configurable units specified by the placement graphs and enable concurrent execution of multiple placement graphs.

Figure 9:
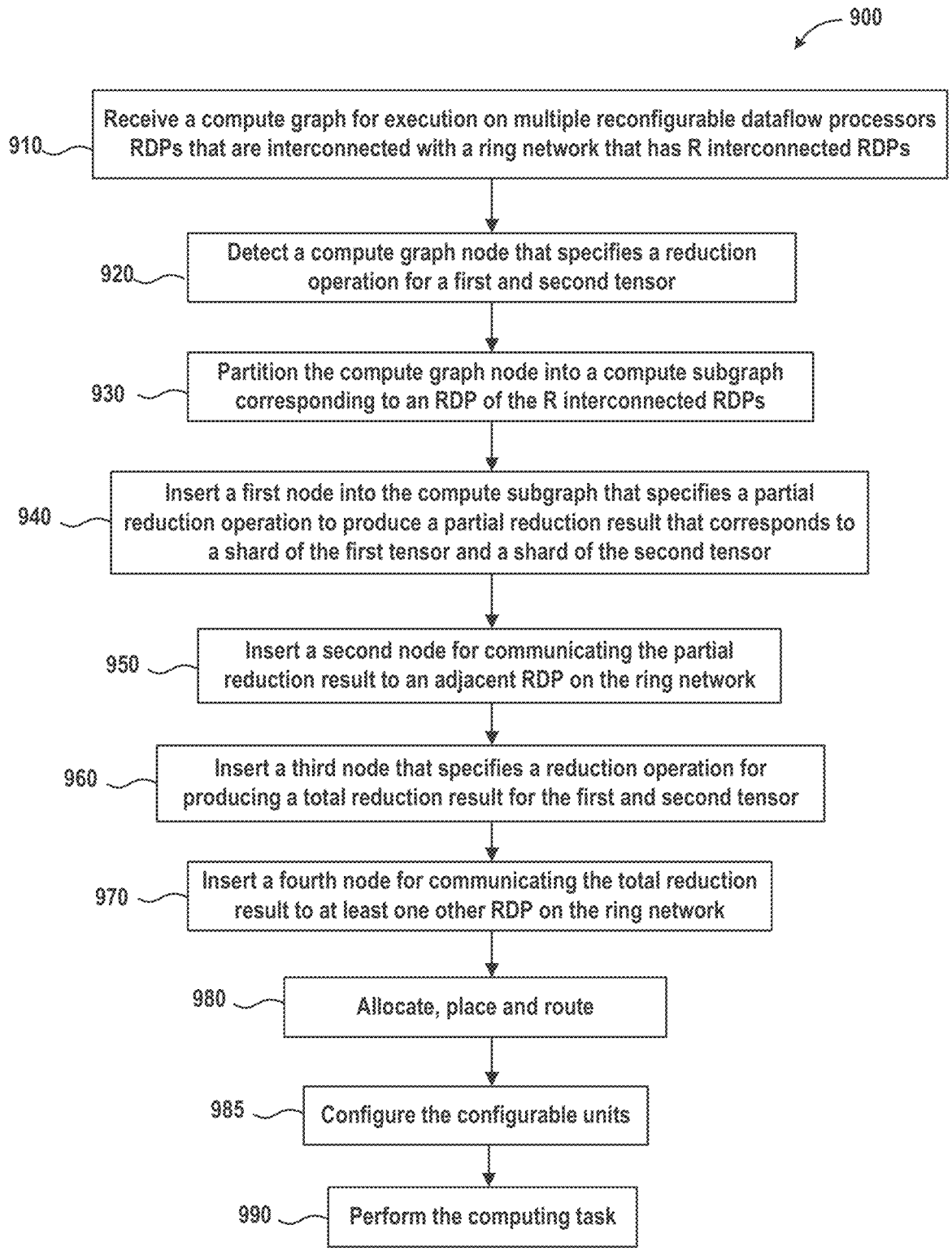
FIG. 9 is a flowchart of one example the reduction compute graph method across multiple RDPs.

FIG. 9 is a flowchart of one example of a compute graph optimization across multiple RDPs method 900 for a CGR dataflow computing system. As depicted, the graph optimization across multiple RDPs method 900 includes receiving (910) a compute graph for execution on R RDPs interconnected with a ring network, detecting (920) a compute graph node, partitioning (930) the detected node into a compute subgraph corresponding to an RDP of the R interconnected RDPs, inserting (940) a first node into the compute subgraph that specifies a partial reduction operation, inserting (950) a second node into the compute subgraph for communicating the partial reduction result to an adjacent RDP on the ring network, inserting (960) a third node into the compute subgraph that specifies a reduction operation, inserting (970) a fourth node into the compute subgraph for communicating the total reduction result, allocating, placing, and routing (980) configurable units, configuring (985) the configurable units, and performing (990) the computing task. The computer-implemented graph optimization method 900 contributes to overall performance improvement in a CGR dataflow computing system.

Receiving (910) a compute graph may include receiving a compute graph for execution on R RDPs interconnected with a ring network. The interconnected ring network may enable parallel data processing by each of the R interconnected RDPs. Each RDP may comprise a grid of compute units and a grid of memory units interconnected with a switching array.

Detecting (920) a compute graph node may include detecting a node that specifies a reduction operation for a first and second tensor. The first and second tensor may have a shared batch dimension (B).

Partitioning (930) the compute graph node may include partitioning the compute graph node into a compute subgraph corresponding to an RDP of the R interconnected RDPs. Partitioning (930) the compute graph node may generate a compute subgraph for each of the R interconnected RDPs such that each subgraph is only visible to the assigned RDP.

The first tensor may have a batch dimension of 1 to produce 1 slice of the first tensor. The second tensor may be sliced along the batch dimension, B, to produce B slices of the second tensor. Further, the slice of the first tensor and each B slice of the second tensor may be sharded along the K-dimension (and/or the M-dimension) to produce R distinct shards of the first tensor slice and corresponding R distinct shards of each of the B second tensor slices. Sharding may enable equal distribution of the R distinct shards of the first tensor slice and R distinct shards of one second tensor slice (of the B second tensor slices) across the R interconnected RDPs of the ring network (one R shard of the first tensor and the corresponding one R shard of the second tensor may be distributed to a designated RDP of the R interconnected RDPs). Such a sharding process may be repeated so that the same first tensor slice may be paired with each second tensor slice of the B second tensor slices.

Each of the R shards of the second tensor may also be tiled along the N-dimension to produce a second tile (of the shard of the second tensor) to provide to a compute unit within an RDP. Tiling may reduce the N-dimension, for example from N=2048 to N=32 for each tile. Sharding and/or tiling tensor slices may save memory and enhance performance. Operations inserted into the compute subgraph for each RDP (e.g., steps 940-970) may reflect the sharding and/or tiling of the first and second tensors at compile time.

Inserting (940) a first node into the compute subgraph may include inserting a node into the compute subgraph that specifies a partial reduction operation for producing a partial reduction result. The partial reduction operation may be restricted to a shard of the first tensor and a shard of the second tensor used as inputs to produce a partial reduction result. The partial reduction operation may include performing a General Matrix Multiplication operation (GeMM) within one or more compute units of an RDP. The partial reduction result may be a tensor, a sub-tensor, a tile, and/or a matrix.

Inserting (950) a second node into the compute subgraph may include inserting a node into the compute subgraph for communicating the partial reduction result to an adjacent RDP on the ring network. The partial reduction result may be communicated from a first RDP of the R interconnected RDPs to a(n adjacent) second RDP of the R interconnected RDPs in the ring network via a peer-to-peer (P2P) link that may include a high speed communication standard, such as PCIe. Communication of each partial reduction result to an adjacent RDP of the R interconnected RDPs of the ring network may occur in a clockwise direction.

Inserting (960) a third node into the compute subgraph may include inserting a node that specifies a reduction operation for producing a total reduction result for the first and second tensor. The reduction operation may include an addition operation, a summation operation, a concatenation operation, or any other operation that can aggregate one or more partial reduction results to produce a total reduction result. The total reduction result may support the calculation of a gradient.

Inserting (970) a fourth node into the compute subgraph may include inserting a node into the compute subgraph for communicating the total reduction result to at least one other RDP on the ring network. Communicating the total reduction result to at least one other RDP may include communicating in a counterclockwise direction. Alternatively, the communication may include correspondence between non-adjacent RDPs of the ring network.

Allocating, placing, and routing (980) configurable units may include placing memory units and compute units and routing connections that enable dataflow between the memory units and compute units.

Configuring (985) the configurable units may include configuring the reconfigurable units of the reconfigurable computing grid. In conjunction therewith, configuring (985) the configurable units may include determining the configuration information for configurable units of the reconfigurable computing grid and communicating the configuration information to one or more RDPs 850 (e.g., via the RDP control module 840). Performing (990) the computing task may include initiating dataflow within the reconfigurable computing grid via the RDP control module 840.

Figure 10:
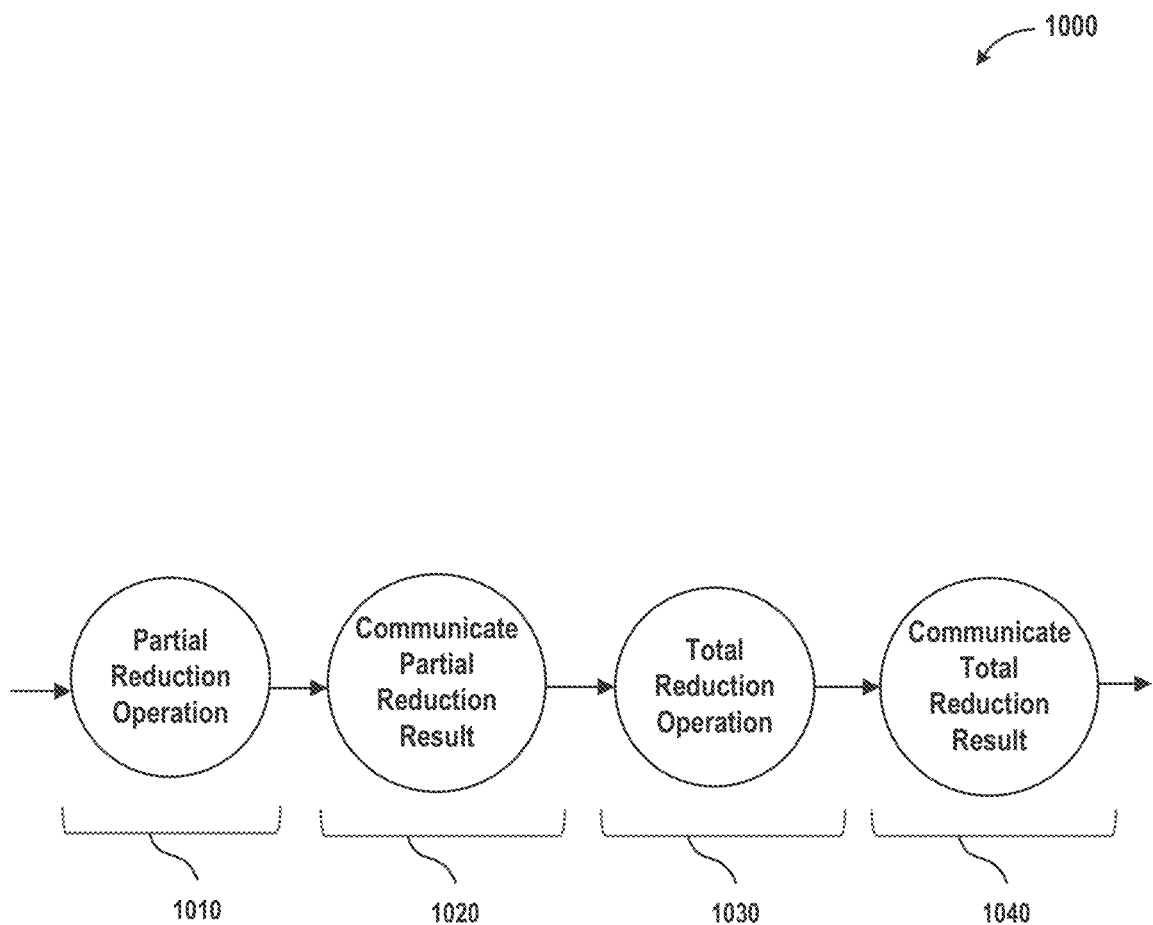
FIG. 10 shows a compute subgraph corresponding to one RDP of the multiple interconnected RDPs.

FIG. 10 shows a compute subgraph 1000 that may correspond to an RDP of the R interconnected RDPs. Each RDP of the R interconnected RDPs of the ring network may receive a compute subgraph 1000. A compute graph having a node that specifies a reduction operation for a first and second tensor may have been modified by partitioning the compute graph node into R compute subgraphs. Each of the R compute subgraphs may correspond to one RDP of the R interconnected RDPs. Partitioning the compute graph node may allow the first and the second tensors to be sliced along the batch dimension to produce the first tensor slice (with B=1) and B second tensor slices. The first tensor (slice) and second tensor (slice of the B second tensor slices) may each be sharded along the K-dimension (and/or the M-dimension) to equally spread R distinct shards of the first tensor and R distinct shards of the second tensor across each of the R interconnected RDPs of the ring network (each RDP receives a distinct R shard of the first tensor and a corresponding distinct R shard of the second tensor).

The compute subgraph 1000 depicts a compute subgraph having four nodes, each of the nodes specifying an operation or a communication. A first node 1010 inserted into the compute subgraph 1000 specifies a partial reduction operation for producing a partial reduction result corresponding to a shard of the first tensor and a shard of the second tensor (as input). Optionally, the input may correspond to a shard of the first tensor and a second tile (of the shard of the second tensor). The partial reduction operation may be a GeMM operation that produces a (first) partial reduction result. The (first) partial reduction result may comprise a tensor, a sub-tensor, a tile, and/or a matrix. The (first) partial reduction result may be provided to a second node 1020 inserted into the compute subgraph 1000.

The second node 1020 inserted into the compute subgraph 1000 specifies communicating the (first) partial reduction result to an adjacent RDP on the ring network. A peer-to-peer communication may be mapped from a first RDP of the R interconnected RDPs to an adjacent RDP of the R interconnected RDPs. Further, the communication may be mapped to the ring network in a clockwise direction, so that a first RDP may provide the (first) partial reduction result to an adjacent RDP (a second RDP) of the R interconnected RDPs. The (first) partial reduction result may be provided to a third node 1030 inserted into the compute graph.

The third node 1030 inserted into the compute subgraph 1000 specifies a reduction operation for producing a total reduction result for the first and second tensor. The reduction operation may include a summation operation, an addition operation, or a concatenation operation. The total reduction result may comprise a tensor, a sub-tensor, a tile, and/or a matrix.

For example, if the ring network comprises 2 interconnected RDPs, each RDP corresponding to one compute subgraph, then a first partial reduction result from the first interconnected RDP and a second partial reduction result from the second interconnected RDP may be received by the reduction operation for producing a total reduction result for the first and second tensor (slices) the first and second tensors (slices) each sharded into 2 distinct shards to produce 2 distinct shards of the first tensor and 2 distinct shards of the second tensor. One distinct shard of the first tensor and the corresponding one distinct shard of the second tensor may serve as input to one of the 2 interconnected RDPs). The total reduction result may be computed by executing a fourth node 1040 inserted into the compute graph.

The fourth node 1040 inserted into the compute subgraph 1000 specifies communicating the total reduction result to at least one other RDP on the ring network. A peer-to-peer communication may proceed from the last RDP of the R interconnected RDPs to at least one other RDP of the R interconnected RDPs. Optionally, the communication may proceed along the ring network in a counterclockwise direction, so that the last RDP may provide the total reduction result to an adjacent RDP (a second to last RDP) of the R interconnected RDPs. The total reduction result may be the subgraph output.

FIG. 11 shows three examples of tensor sharding 1100. The tensor sharding examples may include receiving and detecting a compute graph node, as well as partitioning the compute graph node into 8 subgraphs (one subgraph for each RDP of the 8 interconnected RDPs). A first inserted node may specify a partial reduction operation, specifically a GeMM operation. The GeMM operation may produce a partial reduction result corresponding to a shard of the first tensor and a second tensor. The first tensor has a batch dimension of 1 to form a first tensor slice. The second tensor may be sliced on the batch dimension (B) to produce B slices of the second tensor. The first tensor (slice) may be sharded along the M-dimension to produce 8 (distinct) shards of the first tensor. Each shard of the first tensor (slice) and the second tensor (slice of the B second tensor slices) may provide input to each RDP of the 8 interconnected RDPs. Sharding may spread tensor data across multiple RDPs. Sharding may save memory and enable training of GPT NN language models several times larger (than models without sharding).

The first depicted example of sharding computation 1105 shows an attention function that may map a query and a set of key-value pairs to an output, where the query, keys, values, and output are vectors. The output may be computed as a weighted sum of these values, where the weight assigned to each value may be computed by a compatibility function of the query with the corresponding key. Each of the GeMM operation node on a compute subgraph may correspond to one RDP of the 8 interconnected RDPs of the ring network.

In a second depicted example of sharding, code statements 1110 may comprise a Multi-Head Attention (MHA) function that runs through an attention mechanism several times in parallel across multiple interconnected RDPs of the ring network. MHA can use "h" attention "heads" 1111 in parallel (to attend to different learned projections of a sequence). The attention block 1112 may focus on self-attention (how each word in a sequence is related to other words within that sentence by capturing contextual relationships between words in a sentence), which may be represented by an attention vector 1113 that is generated within attention block 1112. Multiple of each of the attention vectors 1113 may be used for each word and a weighted average may be taken to generate an attention block 1112 that is multi-headed. Each attention vector is independent from each of the other attention vectors, and consequently, the attention vectors may be amenable to parallelization across multiple interconnected RDPs of the ring network.

The scaled dot product attention diagram 1120 may demonstrate how to determine the relationship between two attention vectors. Computing scaled dot products may yield the similarity between the two attention vectors. Specifically, two attention vectors may be closely related if their dot product is 1 (or −1 in the case of negative correlation), and two attention vectors may have no correlation if their dot product is 0.

Linear Function at 1125 may be a straight-line activation function directly proportional to the weighted sum of neurons or input.

Scaled Dot Product Attention 1030 is an attention mechanism where dot products may be scaled down by $\sqrt{d_k}$. Scaled Dot Product Attention 1130 may further be represented by the Attention Function 1040, in which Q and K may be $d_k$-dimensional vectors whose components are independent random variables with mean 0 and variance 1. In Attention Function 1040, the dot product $Q \cdot K = \Sigma_{i=1}^{d_k} u_i v_i$, may have a mean of 0 and a variance $d_k$. Division by $\sqrt{d_k}$ may normalize these values to have a variance of 1. The Attention Function 1140 may also be represented as Attention code statements 1150.

Concatenation layer 1160 may take input and concatenate the input along a specified dimension. Concatenation layer 1160 may append two tensor inputs if the tensor inputs have the same size in all dimensions except a different size in the concatenation dimension. For example, a layer with 256 channels, and another layer with 256 channels when concatenated channel-wise, may yield an output with 512 channels. In general, a list of images of the same size may be combined into a single multi-channel image via concatenation. In deep learning, a concatenation operation may increase the precision of learning.

Computation 1170 shows the Multi-head Attention (MHA) GeMM operation may be a first node of a compute subgraph that specifies partial reduction operation to produce a partial reduction result (tensor) on each RDP of the 8 interconnected RDPs. The tensor input (sliced first and second tensors) may be sharded along the K-dimension to provide ⅛ of the first and second tensors to each of the 8 RDPs (total tensor computation may be 8*[1.5k, 2048]). Specifically, 8 (distinct) shards of the first tensor and 8 (corresponding distinct) shards of the second tensor may serve as input to each RDP of the 8 interconnected RDPs, each RDP having an MHA GeMM operation.

A second node of the compute subgraph may provide for communicating a partial reduction result to an adjacent RDP on the ring network (in a clockwise direction). A third node of the compute subgraph may specify a reduction operation for producing a total reduction result for the first and second tensor. For example, the reduction operation may be a summation or a concatenation operation. A fourth node of the compute subgraph may communicating the total reduction result to at least one other RDP of the 8 interconnected RDPs on the ring network, Sequence 1171 denotes that a partial reduction result may be calculated in each RDP (starting with $RDP_0$), communicated to an adjacent RDP, and summed within the adjacent RDP (until $RDP_7$) as part of a reduction sequence in a clockwise direction; and further, a total sum may be communicated to at least one other (adjacent) RDP, starting at $RDP_7$ and moving counterclockwise to $RDP_0$, as part of a broadcast sequence.

In a third depicted example of sharding, Feed Forward Network (FFN) function 1180 may be applied to every attention vector, so that the output may be consumed by the next encoder or decoder block. Computation 1190 shows a GeMM operation in FFN0 may occur across 8 RDPs, such that the original tensor may be sharded across 8 RDPs along the M-dimension. As a result, each RDP may process a [6k, 2048] tensor during the FFN0 GeMM operation. Computation 1195 shows a GeMM operation in FFN1 may occur in each RDP of the 8 interconnected RDPs. The input for each of the 8 RDPs may be provided via sharding. Specifically, the first tensor slice and the second tensor slice of the B slices of the second tensor may be sharded to generate 8 shards of the first tensor and 8 shards of the second tensor (sharding along the K-dimension). Each RDP may process a [12k, 2048] tensor during the FFN1 GeMM operation.

Sequence 1196 demonstrates that a partial reduction result may be calculated in each RDP (starting with $RDP_0$), communicated to an adjacent RDP, and summed within the adjacent RDP (until $RDP_7$) as part of a reduction sequence in a clockwise direction; and further, a total sum may be communicated to at least one other (adjacent) RDP, starting at $RDP_7$ and moving counterclockwise to $RDP_0$, as part of a broadcast sequence.

Figure 12:
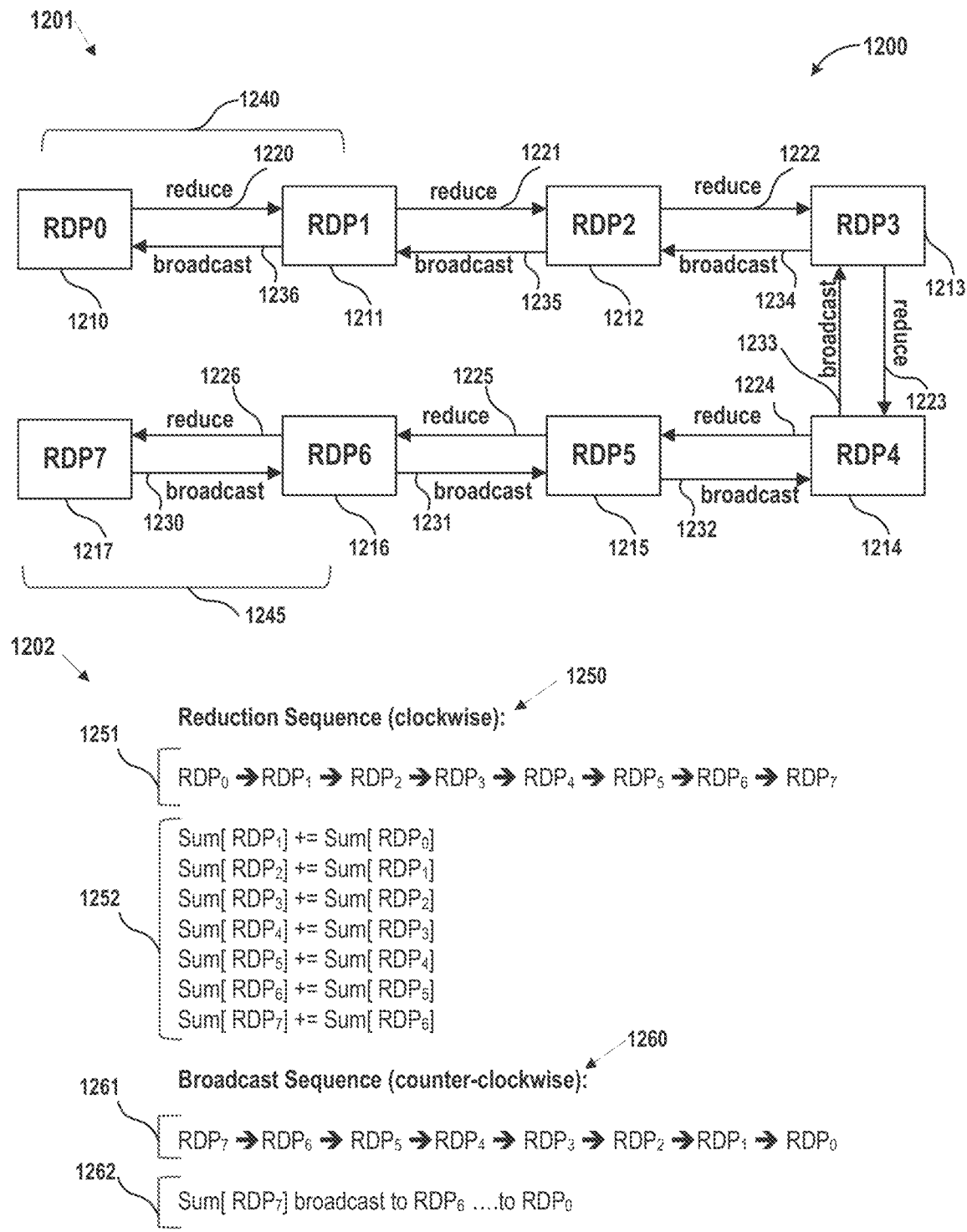
FIG. 12 is a diagram of one example of the reduction compute graph across multiple RDPs.

FIG. 12 shows one example 1200 of the methods described herein. As depicted, diagram 1201 may comprise 8 interconnected RDPs, connected with the ring network. Each RDP may receive as input a shard of the first tensor (slice) and a corresponding shard (and/or tile) of the second tensor (slice of the B slices of the second tensor). A compute subgraph may correspond to each RDP of the 8 interconnected RDPs in the ring network. Each subgraph may comprise a first node specifying a partial reduction operation to generate a partial reduction result, as well as a second node to communicate the partial reduction result to an adjacent RDP (for example reduce link 1220 in a clockwise direction). Further, each RDP may specify a third node to calculate the total reduction result for the first and second tensors. Each RDP may additionally provide a fourth node for communicating the total reduction result to at least one other RDP on the ring network (for example broadcast link 1230 in a counterclockwise direction).

A first and second tensor, having tensor sizes [12288, 49152]*[49152, 2048], may be sliced tensors (the first tensor having a slice dimension of 1 and the second tensor sliced in the B-dimension to produce a second tensor slice of the B tensor slices) that are provided as input to the ring network. The first and second tensors (slices) may be divided in the K-dimension to generate 8 shards of the first and second tensors [12288, 6144]*[6144, 2048] as input (i.e., one distinct shard of the first tensor and one distinct shard of the second tensor may distributed to each RDP of the 8 interconnected RDPs). Each distinct shard of the second tensor may also be tiled to produce a second tile, and the second tile may be provided to a compute unit within an RDP as input. One having skill in the art will recognize that method described herein may increase performance, especially if processing large ML/NLP models, and may reduce overhead and/or memory consumption.

Diagram 1201 may comprise 8 RDPs, RDP0 1210 through RDP7 1217, and each RDP of these 8 RDPs may be interconnected via the ring network. A compute subgraph may correspond to each RDP of the 8 RDPs. Each RDP of the 8 interconnected RDPs may include a first node specifying a partial reduction operation to generate a partial reduction result, as well as a second node to communicate the partial reduction result to an adjacent RDP.

For example, the compute subgraph corresponding to RDP0 1210 may comprise a node specifying a partial reduction operation for producing a (first) partial reduction result. Reduce link 1220 may correspond to the second node on the compute subgraph of RDP0 1210. The second node may be for communicating a (first) partial reduction result to RDP1 1211 (i.e., communication to an adjacent RDP in a clockwise direction). The compute subgraph corresponding to RDP1 1211 may include a third node specifying a reduction operation to be performed on the (first) partial reduction result and a (second) partial reduction result (the second partial reduction result may have been generated in RDP1 1211 via a second node specifying a partial reduction operation). The compute subgraph of RDP1 1211 with third node specifying the reduction operation may produce a first intermediate partial reduction result. Further, the compute subgraph of RDP7 1217 with a third node specifying the reduction operation may produce a total reduction result for the first and second tensor.

The compute subgraph of RDP7 1217 may have a fourth node for communicating the total reduction result in RDP7 1217 to at least one other RDP on the ring network, such as to RDP6 1216. The compute subgraph of RDP6 may have a fourth node for communicating the total reduction result (received by RDP6 1216) to RDP5 1215. Broadcast link 1230 corresponds to the fourth node of the compute subgraph of RDP7 1217, the fourth node specifying a communication to at least one other RDP of the 8 interconnected RDPs.

A reduction sequence computation/model 1250 may demonstrate the dataflow sequence 1251 corresponding to partial reduction result data and/or intermediate partial reduction result data. The reduction sequence of dataflow 1251 may start at the first $RDP_0$ and proceed to the second (and adjacent) $RDP_1$, and this sequence of dataflow may correspond to the model of communications between interconnected compute subgraphs at 1240. The reduction sequence may have dataflow 1251 continue in a clockwise manner until the eighth adjacent RDP receives dataflow.

The sequence of reduction computations 1252 shows that the first partial reduction result data calculated in the $RDP_0$ may be communicated to $RDP_1$; and the first partial reduction result data may be summed with the second partial reduction result data to generate the first intermediate partial reduction result data. Each partial reduction result data may comprise a matrix (or tensor), in which elements from each matrix (or tensor) having the same row-column position are added together. The same clockwise sequence pattern of communications and summations may continue until $RDP_7$ calculates the total reduction result data.

A broadcast sequence computation/model 1260 may demonstrate the sequence of dataflow 1261 of the total sum reduction result data, as well as the sequence of communicating the total reduction result data 1262. The broadcast sequence of dataflow 1261 may start at $RDP_7$ and proceed to adjacent $RDP_6$ (this sequence of dataflow may correspond to the model of communications between interconnected compute subgraphs at 1245), and this counterclockwise sequence may continue until $RDP_0$ receives the dataflow. The broadcast computation 1262 shows that total reduction result data calculated in $RDP_7$ may be communicated to $RDP_6$. Each total reduction result data may comprise a matrix (or tensor). The same counterclockwise sequence pattern of communications may continue until the $RDP_0$ receives the total reduction result data.

Figure 13:
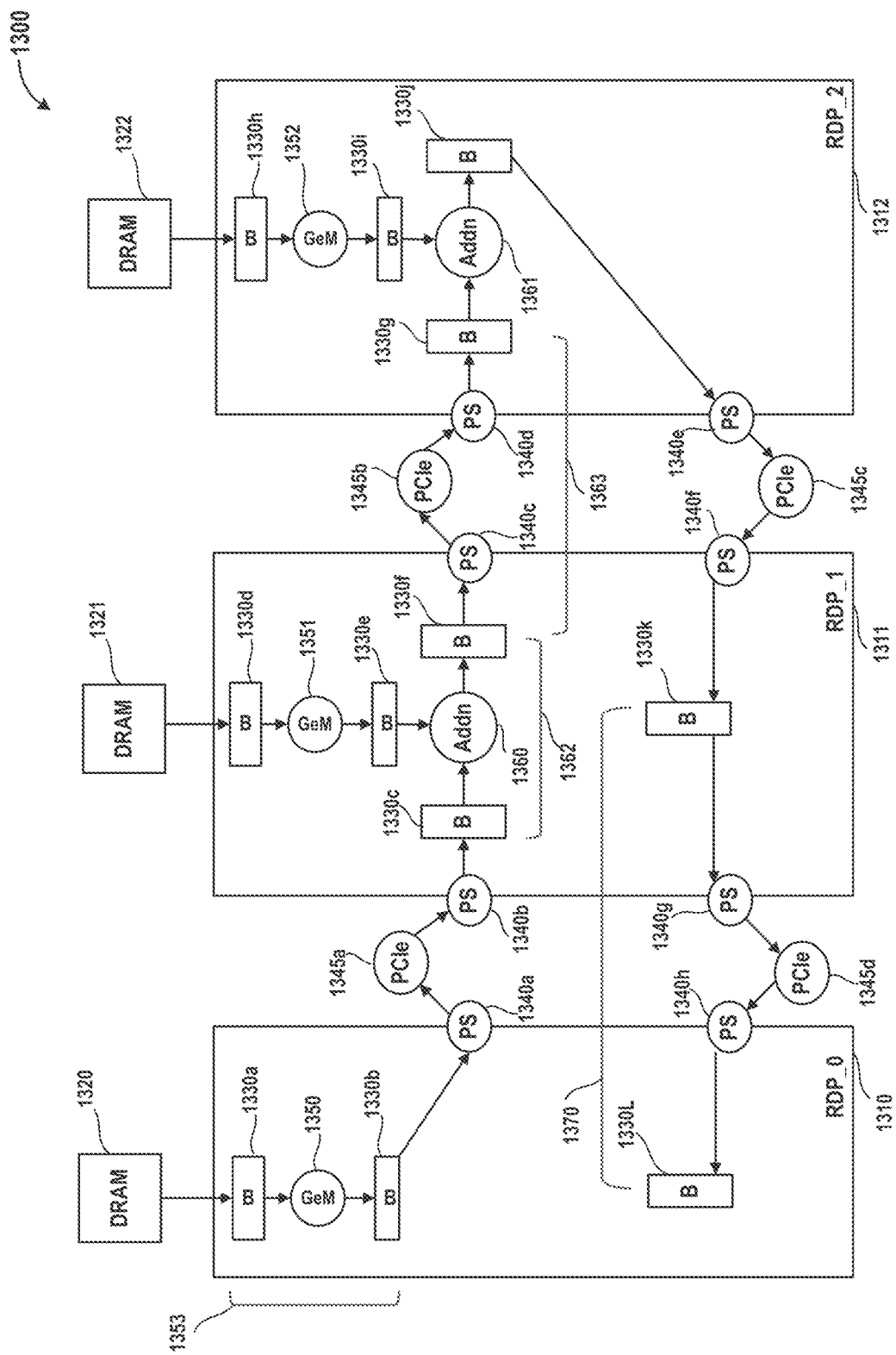
FIG. 13 is a diagram dataflow in executing the compute graph of the methods described herein.

FIG. 13 shows a diagram 1300 of dataflow while executing the compute graph on multiple RDPs corresponding to the method of the present invention. Diagram 1300 depicts three RDPs, a first RDP 1310, a second RDP 1311, and a third RDP 1312. Distinct sharded input tensor data may be distributed to each of the 3 RDPs to improve ML/NLP model processing and performance via parallel RDP data processing and reduced memory usage.

A first tensor, for example, a "weight tensor" with dimensions [M, K] has a batch dimension of 1 and may correspond to a single tensor slice. A second tensor, for example, an "activation tensor" with dimensions [B, K, N], may be sliced in the batch dimension to produce a second tensor slice B*[K, N]. In a GeMM, for example, the same first tensor slice [M, K] may be multiplied with one slice of the B slices of second tensor [K, N]; and the same first tensor slice [M, K] may be multiplied with B different slices of second tensor [K, N]. (. To distribute distinct and equally sized portions of each tensor slice to each of the 3 RDPs, the first tensor slice [M, K] and second tensor slice B*[K, N] may be sharded on the shared accumulation dimension of K to provide input to each of the 3 (or R) interconnected RDPs. Sharding may produce R distinct pairs of a shard of the first tensor slice ([M, K/R]) and a shard of the second tensor slice ([K/R, N]). Each shard of the second tensor slices ([K/R, N]) may be tiled along the N-dimension to produce a second tile ([K/R, 32]). Each RDP may receive a shard of the first tensor slice ([M, K/R]) and the second tile ([K/R, 32]) as inputs for the partial reduction operation (GeMM operation) to produce partial reduction result data ([M, 32]) that is communicated to an adjacent RDP.

The diagram 1300 shows a path of dataflow as the first sharded input tensor slice and the second tile may be received and processed by the first RDP 1310. The first sharded tensor slice input may be stored within an on-chip logical buffer (each buffer corresponding to one or more PMUs) or may be stored in an off-chip DRAM. The second sharded tensor slice may be stored and tiled in an off-chip DRAM 1320. The first sharded tensor slice and the second tile may be provided to on-chip logical buffer 1330a and then to (GeMM) operation node 1350 to produce a first partial reduction result data ([M, 32]) that may be stored in logical buffer 1330b. Buffer 1330a and buffer 1330b may form the boundaries of a first meta-pipeline stage 1353 on first RDP 1310 (having a GeMM meta-pipeline stage latency). Control signals from logical buffer 1330b may be sent to logical buffer 1330a to control dataflow through the meta-pipeline stage. Each (GeMM) operation may correspond to one or more PCUs. By storing the second tile input in DRAM and computing a partial sum within each RDP, memory overhead may be reduced and performance may be increased.

The first partial reduction result data stored in buffer 1330b of the first RDP 1310 may be communicated to the second RDP 1311 via an inter-chip communication (with an inter-chip latency) for storage in buffer 1330c. The first partial reduction result data ([M, 32]) may be sent from buffer 1330b to P-Shim 1340a, to PCIe 1345a, to P-Shim 1340b, and finally sent to buffer 1330c. In the present invention, the inter-chip latency for the (first) partial reduction result data may be less than the GeMM meta-pipeline stage latency to produce a hidden inter-chip latency value and improve performance.

Each RDP within the ring network of R interconnected RDPs may be connected to an adjacent RDP via PCIe links. Each PCIe link may have a bandwidth of 26 GB/s, and each PCIe link may have bi-directional dataflow (i.e. dataflow may proceed from first RDP 1310 to second RDP 1311 with a 26 GB/s bandwidth via PCIe 1345a, and dataflow may proceed from second RDP 1311 to first RDP 1310 with a 26 GB/s bandwidth via PCIe 1345a).

Each RDP may be connected to a PCIe through a P-Shim. Each RDP may have 4 P-Shims (for example, the second RDP 1311 has P-Shim 1340b, P-Shim 1340c, P-Shim 1340g, and P-Shim 1340f), however each RDP may optionally have a greater or lesser number of P-Shims. Each P-Shim link may have a bandwidth of 26 GB/s, and each P-Shim link may have bi-directional dataflow (i.e. dataflow may proceed from first RDP 1310 to second RDP 1311 with a 26 GB/s bandwidth via P-Shim 1340a and then P-Shim 1340b, and dataflow may proceed from second RDP 1311 to first RDP 1310 with a 26 GB/s bandwidth via P-Shim 1340b and then P-Shim 1340a). Pipelining via the method of the present invention may improve P2P link bandwidth and reduce latency during inter-chip communications.

The second RDP 1311 may have the first partial reduction result data ([M, 32]) stored in buffer 1230c. The second RDP 1311 may have a first meta-pipeline stage of RDP 1311 comprised of stage buffer 1330d, GeMM operation 1351, and stage buffer 1330e. Stage buffer 1330d stores input tensor data for processing by GeMM operation 1351 (having a GeMM meta-pipeline latency) to produce a second partial reduction result data ([M, 32]) that may be stored in buffer 1330e. The second meta-pipeline 1362 of the second RDP 1311 may comprise the following: the first partial reduction result data stored in buffer 1330c and the second partial reduction result data stored in buffer 1330e may both be provided as input to addition operation node 1360 to sum the inputs and to produce a first partial intermediate reduction result data ([M, 32]) that may be stored in buffer 1330f. The first partial intermediate reduction result data may be communicated through an inter-chip pipeline phase (or stage) 1363 having an inter-chip latency, in which the first partial intermediate reduction result data may be communicated via dataflow from buffer 1330f to third RDP 1312 (via P-Shim 1340c, PCIe 1345b, and P-Shim 1340d) and then stored in buffer 1330g.

The third RDP 1312 may have the first partial intermediate reduction result data stored in buffer 1230g. The third RDP 1312 may have a first meta-pipeline stage of RDP 1312 comprised of stage buffer 1330h, GeMM operation 1352, and stage buffer 1330i. Stage buffer 1330h may store input tensor data for processing by GeMM operation 1352 to produce a third partial reduction result data ([M, 32]) that may be stored in buffer 1330i. The second meta-pipeline of the third RDP 1312 may comprise the following: the first partial intermediate reduction result data stored in buffer 1330g and the third partial reduction result data stored in buffer 1330i may both be provided as input to addition operation node 1361 to sum the inputs and to produce a total reduction result data ([M, 32]) that may be stored in buffer 1330j. Production of the total reduction result data may demarcate the end of the reduction sequence and the beginning of the broadcast sequence.

The total reduction result data stored in buffer 1330j may be communicated through an inter-chip pipeline phase (or stage) to second RDP 1311 (via P-Shim 1340e, PCIe 1345c, and P-Shim 1340f) and then stored in buffer 1330k. Inter-chip communication of the total reduction result data from buffer 1330j to buffer 1330k has an inter-chip latency. In other embodiments, the third RDP 1312 may optionally provide the total reduction result data to a separate operation node in third RDP 1312, in addition to communicating the total reduction result data in the previously described broadcast sequence.

A second part of the broadcast sequence 1370 shows the total reduction result data may be communicated from buffer 1330k in second RDP 1311 to buffer 1330L in the first RDP 1310. The total reduction result data in buffer 1330k in the second RDP 1311 may optionally be provided to one or more operation nodes in the second RDP 1311. Similarly, the total reduction result data in buffer 1330L in the first RDP 1310 may optionally be provided to one or more operation nodes in the first RDP 1310. Receipt of the total reduction result data by the first RDP 1310 may demarcate the end of the reduction sequence for processing several tensor inputs. One having skill in the art will recognize that a continuous flow of tensor data (shards and/or tiles) may proceed in the described linked network of multiple interconnected RDPs to allow parallel data processing with improved performance and reduced memory consumption.

FIG. 14 shows a diagram 1400 of one example of dataflow through a pipeline while executing a compute graph having 3 RDPs according to the methods of the present invention. Diagram 1400 demonstrates the details of parallel data processing that may be achieved with dataflow through 3 RDPs (for example, in FIG. 13).

The complete dataflow pipeline in diagram 1400 may be comprised of two types of pipelines 1402. The first type of pipeline may include one or more meta-pipeline stages within a single RDP (e.g., one meta-pipeline stage 1410 may comprise a single GeMM operation in the first RDP 1403; and the GeMM operation may be demarcated by two stage buffers that may receive data from or send data to each stage buffer). The second type of pipeline may include one inter-chip pipeline phase that may exist between two RDPs to facilitate the communication of tensor data between two chips (e.g., an inter-chip pipeline phase 1420 may include communicating a first partial reduction result data from the first RDP 1403 to the second RDP 1404 via a P-Shim on the first RDP 1403, then to a connecting PCIe link, then to a P-Shim on the second RDP 1404).

An inter-chip pipeline phase may provide clockwise communication during a reduction sequence 1401 (for example, inter-chip pipeline phase 1420 and/or 1440). Alternatively, an inter-chip pipeline phase may provide counterclockwise communication during a broadcast sequence 1401 (for example, inter-chip pipeline phase 1460 and/or 1470).

The ring network of R interconnected RDPs may have two or more separate and distinct (ring) pathways, each with a specific and distinct dataflow direction (ie, clockwise and counterclockwise). The clockwise (ring) pathway corresponds to a first set of (triplet) inter-chip pipeline links that only communicate partial reduction result data in a clockwise direction to an adjacent RDP during the reduction sequence (for example, in FIG. 13, the first set of inter-chip pipeline links may include both triplets: 1340a-1345a-1340b and 1340c-1345b-1340d). The counterclockwise (ring) pathway corresponds to a second set of (triplet) inter-chip pipeline links that only communicates total reduction result data in one direction to an adjacent RDP during the broadcast phase (for example, in FIG. 13, the second set of triplet inter-chip pipeline links may include both triplets: 1340e-1345c-1340f and 1340g-1345d-1340h).

The physical separation between the first and second sets of (triplet) inter-chip pipeline links, as well as their corresponding separate directions of dataflow, may be particularly beneficial for ensuring continuous (tensor) dataflow through the R interconnected RDPs of the ring network. Moreover, having separate sets of (triplet) inter-chip pipeline links may ensure that the full bandwidth (i.e., 26 GB/s) can be used during each communication for each direction during the method of the present invention. Specifically, the reduce sequence of clockwise communications may use the full bandwidth on one (ring) pathway and broadcast sequence of counterclockwise communications may use the full bandwidth on a separate (ring) pathway.

An additional benefit of the pipelined dataflow design of the present method includes a reduced latency through each inter-chip pipeline phase, since the entire bandwidth may be used during each communication. Moreover, the method of the present invention may enable the inter-chip pipeline phase latency to be smaller than the (GeMM) operation meta-pipeline stage latency, which effectively masks or hides the inter-chip pipeline phase communication latency (cost).

Diagram 1400 may allow the tracing of dataflow through the 3 interconnected RDPs of the linked network. A first sharded tensor slice and a second tile (of a second sharded tensor slice of the B tensor slices) may be provided to meta-pipeline stage 1410 of RDP_0 (1403) in the Reduction Sequence. In meta-pipeline stage 1410, the GeMM operation may process input tensor data to produce a first partial reduction result data. In inter-chip pipeline phase 1420, the first partial reduction result data may be communicated from RDP_0 (1403) to RDP_1 (1404) to continue the Reduction Sequence. The latency of inter-chip pipeline phase 1420 may be less than the latency of meta-pipeline stage 1410.

Meta-pipeline stage 1430 on RDP_1 (1404) may include a GeMM operation to produce a second partial reduction result data. In meta-pipeline stage 1440 on RDP_1 (1404), the first and second partial reduction result data may be summed (via Addn) to produce a first intermediate partial reduction result data. Inter-chip pipeline phase 1450 may communicate the first intermediate partial reduction result data from RDP_1 (1404) to RDP_2 (1405), to continue the reduction sequence. In meta-pipeline stage 1460, the third partial reduction result data may be generated via GeMM on RDP_2 (1405). In the final step of the reduction phase and the meta-pipeline stage 1470, the third partial reduction result data may be summed with the first intermediate partial stage (via Addn) to produce the total reduction result data.

The Broadcast Sequence may begin with RDP_2 (1405) communication of the total reduction result data to RDP_1 (1404) via inter-chip pipeline phase 1480. Then, inter-chip pipeline phase 1490 may complete the broadcast sequence by communicating the total reduction result data from RDP_1 (1404) to RDP_0 (1403). One having skill in the art will recognize that the tensor dataflow may be continuous through such a linked network of R interconnected RDPs. Specifically, each pipeline phase and/or stage may be continuously receiving tensor data (i.e. no blank spots, for example tensor data may be processed in RDP_2 (1405) while meta-pipeline stage 1410 is processing tensor data on RDP_0 (1403)). Moreover, the number of RDPs may be increased beyond 3 RDPs to further improve performance.

Figure 15:
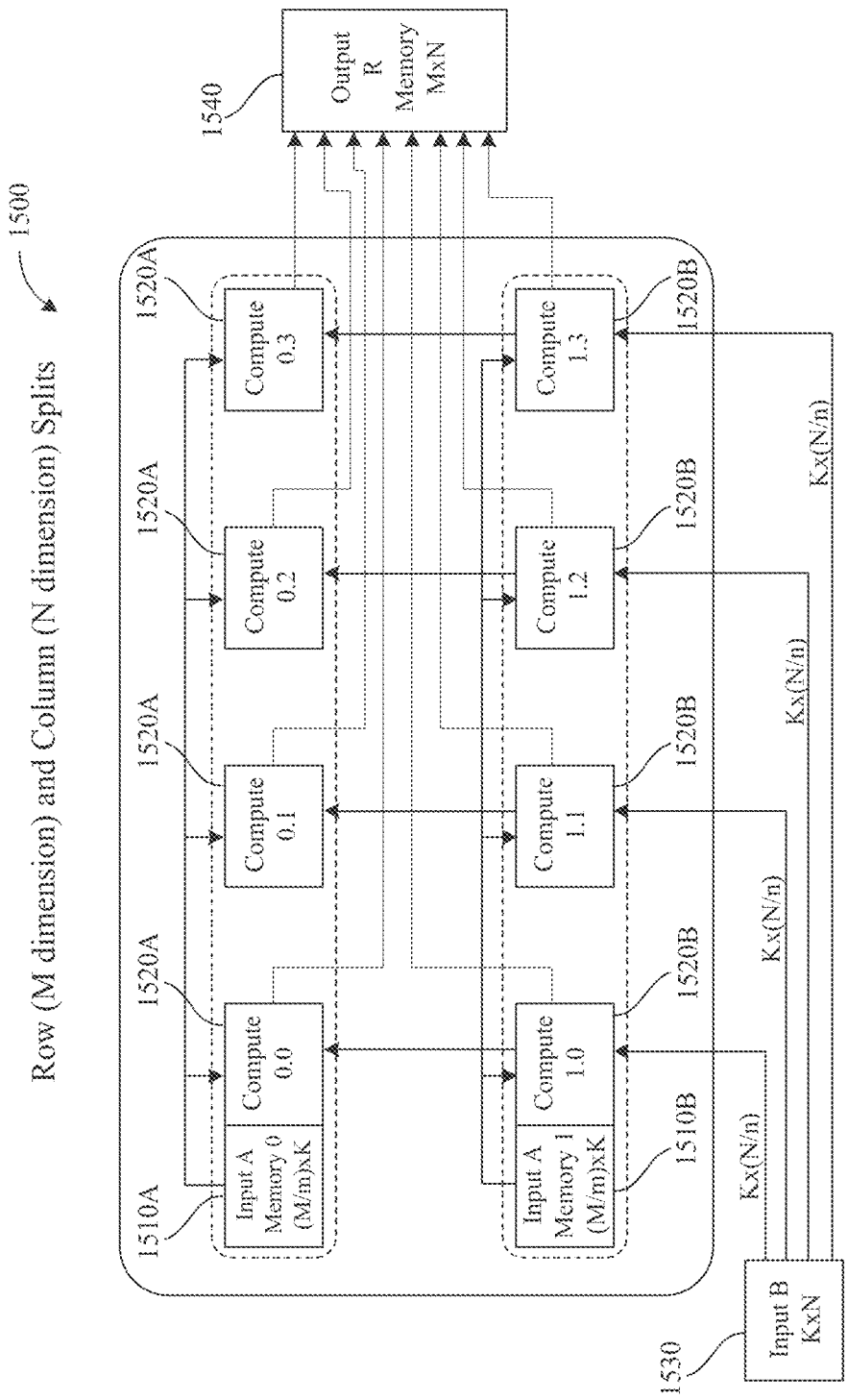
FIG. 15 shows one example of distributing tensors in an example grid computing environment.

FIG. 15 shows one example of distributing tensors in an example grid computing environment. As depicted, tensor (shard) A data may be distributed to memory units 1510 that are each (tightly) coupled to, and dedicated to, a row of compute units 1520. Tensor (tile) B may be stored in a single memory unit 1530 and tensor (tile) R may be stored in a single (grid connected) memory unit 1540. The compute grid may have m rows and n columns (m×n). Tensor A and tensor R may comprise M rows, whereas tensor B and tensor R may comprise N columns (specifically, N may correspond to the column dimension of the tile, with N=32).

In the depicted example, memory unit 1510A is coupled to (a first row of) compute units 1520A, memory unit 1510B is coupled to (a second row of) compute units 1520B and M/m (i.e., half of the) rows of tensor A are provided to each row of compute units 1520 in K sequentially streamed vector packets comprising tensor A.

In contrast, tensor B data may be narrowcast, as needed, to a specific set of compute units. For example, all of the compute units in a column of a (virtual or physical) computing grid may be provided with specific (e.g., N/n) columns from tensor B that correspond to their assigned sub-tensor. The specific columns may be sent (i.e., narrowcast) from one or more memory units 1530 via a set of K packets that are intended only for those compute units. Consequently, in the described embodiment, each of the compute units in the grid need only be provided with and receive those packets that contain those columns of tensor B that correspond to their assigned sub-tensor. Narrowcasting may be implemented by the methods of the present invention, for example, to provide smaller tensor blocks or tiles that may be split along the column direction for processing an operation (i.e., GeMM operation) on each RDP of the R interconnected RDPs of the ring network.

In the depicted embodiment, tensor B may be stored in a single memory unit 1530 and tensor R may be stored in a single (grid connected) memory unit 1540. However, tensor B and/or tensor R, may be spread across multiple memory units 1530/1540. In those embodiments, an interposer memory unit (not shown) may be used to retrieve tensor B data and distribute the data to the appropriate compute units as needed. Similarly, an interposer memory unit (not shown) may be used to receive tensor R data from the compute units and distribute the data to the appropriate memory units that are selected to (at least temporarily) store tensor R.

As shown in FIG. 15, tensor A data may be preferably partitioned by rows into separate memory units for each row of compute units. In contrast, tensor B (tile) data may be communicated (narrowcasted) to each column of compute units by a similar partitioning of the tensor B data by columns.

Figure 16:
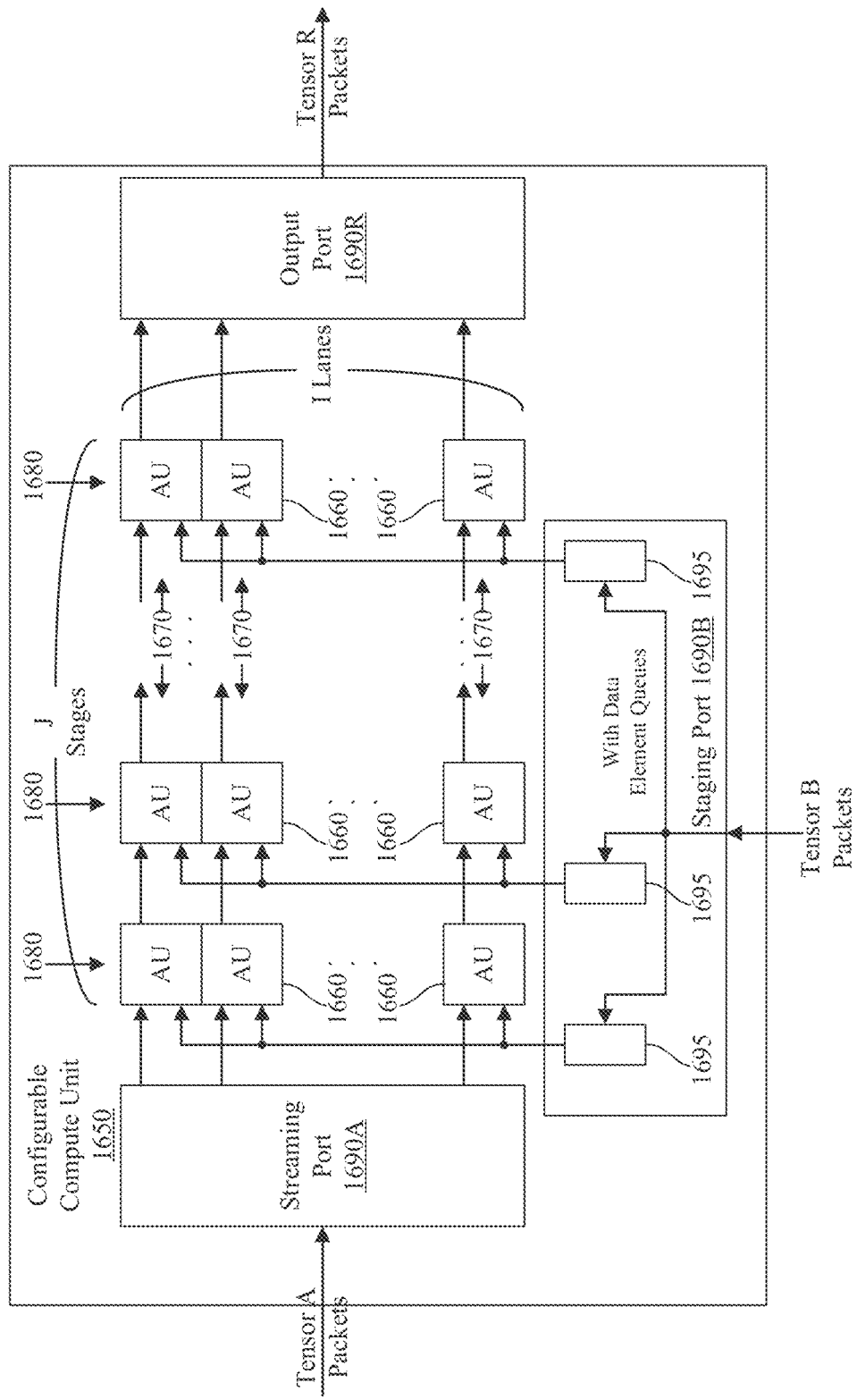
FIG. 16 is a block diagram illustrating one example of a compute unit configurable for the methods disclosed herein.

FIG. 16 is a block diagram illustrating one example of a compute unit 1650 configurable for tensor (GeMM) operations. As depicted, the compute unit 1650 includes an array of arithmetic units 1660 organized into I lanes 1670 and J (pipelined) stages 1680. The compute unit 1650 also includes a set of ports 1690 including a streaming port 1690A that receives packets of tensor (shard) A data, a staging port 1690B that receives packets of tensor (tile) B data, and an output port 1690R that provides packets of tensor R (tile) data. A packet of tensor A data and a packet of tensor R data may correspond to a tensor block with M rows, whereas a packet of tensor B data and a packet of tensor R data may correspond to a tensor block with N columns.

The streaming port 1690A may be configured to sequentially stream K vector packets comprising tensor A data through the I lanes of the array of arithmetic units 1660. Each of the K vector packets may comprise I column-ordered data elements corresponding to I rows of tensor A data. Alternatively, each of the K vector packets may comprise I column-ordered data elements corresponding to I columns of tensor A data. In one embodiment, a row connected memory unit is configured to stream the I rows of tensor A data by providing the K vector packets to the compute unit 1650 and other compute units 1650 on the same row of a computing grid that are assigned to perform the tensor operation.

The staging port 1690B may be configured to receive J vector packets corresponding to J columns of tensor B data and sequentially provide a data element from each of the J vector packets to a corresponding stage of the array of arithmetic units 1660. The J vector packets may be received by a set of J data element queues 1695 that sequentially provide one data element at a time to the arithmetic units 1660 of the corresponding stage 1670.

The arithmetic units 1660 may be configured to repetitively conduct operations by using a data element from the streaming port (i.e., a row of tensor A) and a data element from the staging port (i.e., a column of tensor B). One of skill in the art will appreciate that the stages 1680 of the array of arithmetic units 1660 may act as data registers for the lanes 1680 while the tensor A data is streamed through the stages of the compute unit and the operations are conducted. When the K operations are complete, the computed values may be streamed to one or more assigned memory units via the output port 1690R. The process may be repeated until all rows (e.g., M/m) and columns (e.g., N/n) of the assigned sub-tensor (tile) have been computed by the compute unit 1650.

The examples disclosed herein include a system with reconfigurable dataflow processors, the system comprising:
   a host computer comprising a graph optimization module configured to conduct a method comprising:
      receiving a compute graph for execution on multiple reconfigurable dataflow processors (RDPs), the multiple RDPs being interconnected with a ring network, the ring network having R interconnected RDPs
      detecting a compute graph having a node that specifies a reduction operation for a first and second tensor
      partitioning the compute graph node into a compute subgraph corresponding to an RDP of the R interconnected RDPs
      inserting a first node into the compute subgraph that specifies a partial reduction operation for producing a partial reduction result corresponding to a shard of the first tensor and a shard of the second tensor
      inserting a second node into the compute subgraph for communicating the partial reduction result to an adjacent RDP on the ring network
      inserting a third node into the compute subgraph that specifies a reduction operation for producing a total reduction result for the first and second tensor
      inserting a fourth node into the compute subgraph for communicating the total reduction result to at least one other RDP on the ring network
   Optional features for the above system include:
   wherein the partial reduction operation comprises a General Matrix Multiplication (GeMM) operation
      wherein the GeMM operation has a GeMM meta-pipeline stage latency
   wherein a shard of the second tensor is tiled along the N-dimension to produce a second tile that is provided to a compute unit within the RDP
   wherein communicating a partial reduction result to the adjacent RDP on the ring network results in an inter-chip latency for the partial reduction result
      wherein the inter-chip latency for the partial reduction result is less than the GeMM meta-pipeline stage latency
   wherein the reconfigurable dataflow processors (RDPs) comprises a grid of compute units and a grid of memory units interconnected with a switching array, each compute unit comprising an array of arithmetic units organized into I lanes and J meta-pipeline stages
      wherein the tensor comprises M rows or N columns
         providing each of the M rows to a different lane of the I lanes or sequentially providing each of the N columns to a stage of the J stages
            wherein the M rows or N columns are provided by or received by at least one memory unit
            wherein the tensor flows through at least one compute unit of the grid of compute units
            wherein the tensor flow is controlled by the at least one memory unit The embodiments disclosed herein include a method in a reconfigurable computing system, the method comprising:
   receiving a compute graph for execution on multiple reconfigurable dataflow processors (RDPs), the multiple RDPs being interconnected with a ring network, the ring network having R interconnected RDPs
   detecting a compute graph having a node that specifies a reduction operation for a first and second tensor partitioning the compute graph node into a compute subgraph corresponding to an RDP of the R interconnected RDPs inserting a first node into the compute subgraph that specifies a partial reduction operation for producing a partial reduction result corresponding to a shard of the first tensor and a shard of the second tensor inserting a second node into the compute subgraph for communicating the partial reduction result to an adjacent RDP on the ring network inserting a third node into the compute subgraph that specifies a reduction operation for producing a total reduction result for the first and second tensor inserting a fourth node into the compute subgraph for communicating the total reduction result to at least one other RDP on the ring network Optional features for the above method include:

wherein the partial reduction operation comprises a General Matrix Multiplication (GeMM) operation wherein the GeMM operation has a GeMM meta-pipeline stage latency wherein a shard of the second tensor is tiled along the N-dimension to produce a second tile that is provided to a compute unit within the RDP wherein communicating a partial reduction result to the adjacent RDP on the ring network results in an inter-chip latency for the partial reduction result wherein the inter-chip latency for the partial reduction result is less than the GeMM meta-pipeline stage latency wherein the reconfigurable dataflow processors (RDPs) comprises a grid of compute units and a grid of memory units interconnected with a switching array, each compute unit comprising an array of arithmetic units organized into I lanes and J meta-pipeline stages wherein the tensor comprises M rows or N columns providing each of the M rows to a different lane of the I lanes or sequentially providing each of the N columns to a stage of the J stages wherein the M rows or N columns are provided by or received by at least one memory unit wherein the tensor flows through at least one compute unit of the grid of compute units wherein the tensor flow is controlled by the at least one memory unit As will be appreciated by those of ordinary skill in the art, aspects of the various embodiments described herein may be embodied as a system, device, method, process, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "circuit," "circuitry," "module," "computer," "logic," "FPGA," "unit," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage mediums may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method or process. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e., embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

What is claimed is:

1. A computing system, the system comprising:
   a host computer comprising a graph optimization module configured to conduct a method comprising:
     receiving a compute graph for execution on multiple reconfigurable dataflow processors RDPs, the multiple RDPs being interconnected with a ring network, the ring network having R interconnected RDPs, including a first RDP, and a second RDP adjacent to the first RDP in the ring network, wherein R is an integer value;
     detecting a node of the compute graph that specifies a reduction operation for a first tensor and a second tensor;
     partitioning the node of the compute graph into a compute subgraph corresponding to the first RDP;
     inserting a first inserted node into the compute subgraph that specifies a partial reduction operation for producing a partial reduction result corresponding to a shard of the first tensor and a shard of the second tensor;
     inserting a second inserted node into the compute subgraph for communicating the partial reduction result to the second RDP;
     inserting a third inserted node into the compute subgraph that specifies a reduction operation for producing a total reduction result for the first tensor and the second tensor; and
     inserting a fourth inserted node into the compute subgraph for communicating the total reduction result to the first RDP.

2. The system of claim 1, wherein the partial reduction operation comprises a General Matrix Multiplication GeMM operation.

3. The system of claim 2, wherein the GeMM operation has a GeMM meta-pipeline stage latency.

4. The system of claim 1, wherein the first tensor is sharded to generate R distinct shards of the first tensor, and wherein the second tensor has B distinct slices of the second tensor, each B distinct slice of the second tensor is sharded to generate R distinct shards of the second tensor, each R distinct shard of the second tensor is tiled to generate more than one distinct tiles of the second tensor, and such that a compute unit within an RDP of the R interconnected RDPs receives a distinct tile of the second tensor.

5. The system of claim 3, wherein communicating a partial reduction result to the second RDP results in an inter-chip latency for the partial reduction result.

6. The system of claim 5, wherein the inter-chip latency for the partial reduction result is less than the GeMM meta-pipeline stage latency.

7. The system of claim 4, wherein the RDPs comprise a grid of compute units and a grid of memory units interconnected with a switching array, each compute unit comprising an array of arithmetic units organized into I lanes and J meta-pipeline stages, wherein I is an integer value greater than one, and wherein J is an integer value greater than one.

8. The system of claim 7, wherein each distinct shard of the first tensor comprises M distinct rows and each distinct tile of the second tensor comprises N distinct columns, such that each different lane of the I lanes receives a corresponding M distinct row and each different stage of the J meta-pipeline stages sequentially receives a corresponding N distinct column, wherein M is an integer value greater than one, and wherein N is an integer value greater than one.

9. A computer implemented method, the method comprising:
   receiving a compute graph for execution on multiple reconfigurable dataflow processors RDPs, the multiple RDPs being interconnected with a ring network, the ring network having R interconnected RDPs, including a first RDP, and a second RDP adjacent to the first RDP in the ring network, wherein R is an integer value;
   detecting a node of the compute graph that specifies a reduction operation for a first tensor and a second tensor;
   partitioning the node of the compute graph into a compute subgraph corresponding to the first RDP;
   inserting a first inserted node into the compute subgraph that specifies a partial reduction operation for producing a partial reduction result corresponding to a shard of the first tensor and a shard of the second tensor;
   inserting a second inserted node into the compute subgraph for communicating the partial reduction result to the second RDP;
   inserting a third inserted node into the compute subgraph that specifies a reduction operation for producing a total reduction result for the first tensor and a second tensor; and
   inserting a fourth inserted node into the compute subgraph for communicating the total reduction result to the first RDP.

10. The method of claim 9, wherein the partial reduction operation comprises a General Matrix Multiplication GeMM operation.

11. The method of claim 10, wherein the GeMM operation has a GeMM meta-pipeline stage latency.

12. The method of claim 9, wherein the first tensor is sharded to generate R distinct shards of the first tensor, and wherein the second tensor has B distinct slices of the second tensor, each B distinct slice of the second tensor is sharded to generate R distinct shards of the second tensor, each R distinct shard of the second tensor is tiled to generate more than one distinct tiles of the second tensor, and such that a compute unit within an RDP of the R interconnected RDPs receives a distinct tile of the second tensor.

13. The method of claim 11, wherein communicating a partial reduction result to the second RDP results in an inter-chip latency for the partial reduction result.

14. The method of claim 13, wherein the inter-chip latency for the partial reduction result is less than the GeMM meta-pipeline stage latency.

15. The method of claim 12, wherein the RDPs comprise a grid of compute units and a grid of memory units interconnected with a switching array, each compute unit comprising an array of arithmetic units organized into I lanes and J meta-pipeline stages, wherein I is an integer value greater than one, and wherein J is an integer value greater than one.

16. The method of claim 15, wherein each distinct shard of the first tensor comprises M distinct rows and each distinct tile of the second tensor comprises N distinct columns, such that each different lane of the I lanes receives a corresponding M distinct row and each different stage of the J meta-pipeline stages sequentially receives a corresponding N distinct column, wherein M is an integer value greater than one, and wherein N is an integer value greater than one.

17. A computer program product comprising a computer readable storage medium having program instructions embodied therewith, wherein the computer readable storage medium is not a transitory signal per se, wherein the program instructions are executable by a processor to cause the processor to conduct a method comprising:
    receiving a compute graph for execution on multiple reconfigurable dataflow processors RDPs, the multiple RDPs being interconnected with a ring network, the ring network having R interconnected RDPs, including a first RDP, and a second RDP adjacent to the first RDP in the ring network, wherein R is an integer value;
    detecting a node of the compute graph that specifies a reduction operation for a first tensor and a second tensor;
    partitioning the node of the compute graph into a compute subgraph corresponding to the first RDP;
    inserting a first inserted node into the compute subgraph that specifies a partial reduction operation for producing a partial reduction result corresponding to a shard of the first tensor and a shard of the second tensor;
    inserting a second inserted node into the compute subgraph for communicating the partial reduction result to the second RDP;
    inserting a third inserted node into the compute subgraph that specifies a reduction operation for producing a total reduction result for the first tensor and a second tensor;
    inserting a fourth inserted node into the compute subgraph for communicating the total reduction result to the first RDP;
    generating a file for execution by the RDPs; and
    saving the file in a memory of a host computer.

18. The system of claim 1, wherein a file is generated for execution by the RDPs, and the file is saved in a memory of the host computer.

19. The method of claim 9, wherein a file is generated for execution by the RDPs, and the file is saved in a memory of a host computer.

* * * * *